United States Patent
Katsura et al.

(10) Patent No.: US 10,985,638 B2
(45) Date of Patent: Apr. 20, 2021

(54) ROTARY ELECTRIC MACHINE

(71) Applicant: EXEDY Corporation, Neyagawa (JP)

(72) Inventors: Hitoshi Katsura, Neyagawa (JP); Kohsuke Murata, Neyagawa (JP); Taichi Kitamura, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 74 days.

(21) Appl. No.: 16/480,408

(22) PCT Filed: Jan. 26, 2018

(86) PCT No.: PCT/JP2018/002372
§ 371 (c)(1),
(2) Date: Jul. 24, 2019

(87) PCT Pub. No.: WO2018/139561
PCT Pub. Date: Aug. 2, 2018

(65) Prior Publication Data
US 2020/0161952 A1 May 21, 2020

(30) Foreign Application Priority Data

Jan. 27, 2017 (JP) .............................. JP2017-013495
Dec. 25, 2017 (JP) .............................. JP2017-248191

(51) Int. Cl.
*H02K 21/04* (2006.01)
*H02K 1/02* (2006.01)
*H02K 7/00* (2006.01)

(52) U.S. Cl.
CPC ............. *H02K 21/044* (2013.01); *H02K 1/02* (2013.01); *H02K 7/006* (2013.01); *H02K 2201/03* (2013.01)

(58) Field of Classification Search
CPC ........... H02K 21/044; H02K 1/27; H02K 7/09
(Continued)

(56) References Cited

U.S. PATENT DOCUMENTS 9,136,747 B2   9/2015 Yokota et al.
2004/0174089 A1   9/2004 Maeda et al.
(Continued)

FOREIGN PATENT DOCUMENTS

CN    101595320 A    12/2009
DE    1245483 B    7/1967
(Continued)

OTHER PUBLICATIONS

Extended European Search Report dated Jun. 26, 2020 for corresponding European Application No. 18744762.8, 9 pp.
(Continued)

*Primary Examiner* — Jose A Gonzalez Quinones
(74) *Attorney, Agent, or Firm* — United IP Counselors, LLC

(57) ABSTRACT

A rotary electrical machine includes a stator, a field core, a rotor, and first and second air gaps. The stator includes an AC coil that generates a rotating magnetic field with an alternating current. The field core includes a field coil excited by a direct current. The rotor is disposed on an outer circumference of a starting apparatus and held rotatably about a rotational axis relative to the stator and the field coil. The first air gap is formed between the stator and the rotor, and allows a magnetic flux to flow therebetween. The second air gap is formed between the field core and the rotor, and allows a magnetic flux to flow therebetween. The second air gap defines an interval extending along a direction that intersects an axial direction of the rotational axis on one end surface of the rotor in the axial direction of the rotational axis.

13 Claims, 18 Drawing Sheets

(58) Field of Classification Search
USPC .................................. 310/179, 180, 184, 266
See application file for complete search history.

(56) References Cited

U.S. PATENT DOCUMENTS

| | | |
|---|---|---|
| 2004/0195925 A1 | 10/2004 | Kusase et al. |
| 2005/0625869 | 11/2005 | Hsu |
| 2007/0018524 A1 | 1/2007 | Yonemori et al. |
| 2009/0283344 A1 | 11/2009 | Arnold et al. |
| 2013/0300242 A1 | 11/2013 | Yamada et al. |

FOREIGN PATENT DOCUMENTS

| | | | |
|---|---|---|---|
| JP | S52-036710 | A | 3/1977 |
| JP | H02-159950 | A | 6/1990 |
| JP | 3445492 | B2 | 9/2003 |
| JP | 2004-266965 | A | 9/2004 |
| JP | 2007-037213 | A | 2/2007 |
| JP | 2010-516558 | A | 5/2010 |
| JP | 2013-212037 | A | 10/2013 |
| WO | 2012/067223 | A1 | 5/2012 |

OTHER PUBLICATIONS

Translation of the International Preliminary Report on Patentability, dated Aug. 8, 2019 for corresponding International Application No. PCT/JP2018/002372, 10 pp.
Chinese Office Action of the corresponding Chinese Application No. 201880008601.3, dated Oct. 22, 2020, 14 pp.
International Search Report dated Apr. 24, 2018 for corresponding International Application No. PCT/JP2018/002372, pp. 2.

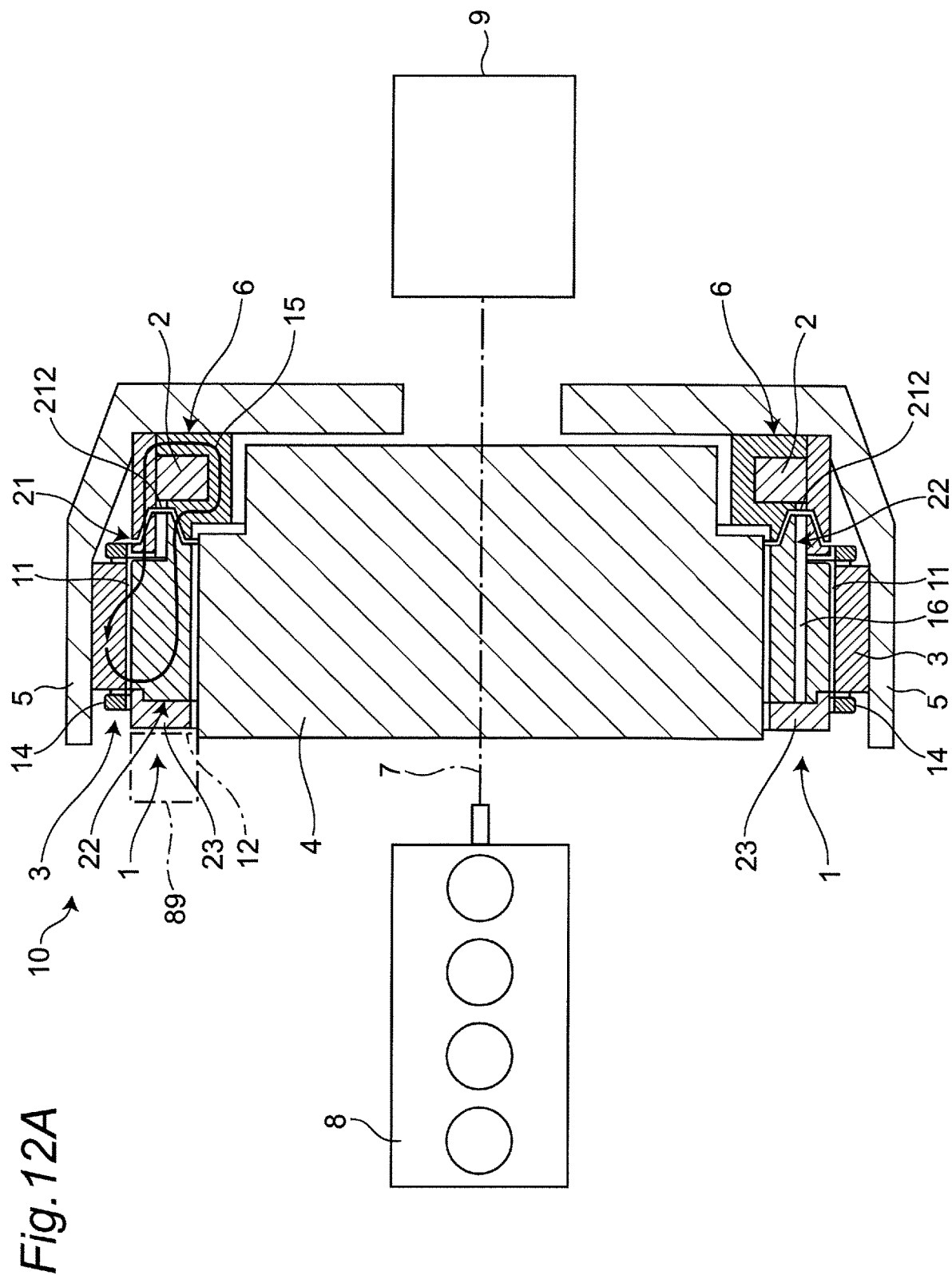

ROTARY ELECTRIC MACHINE

CROSS-REFERENCE TO RELATED APPLICATIONS

This application is the National Phase in the United States of PCT/JP2018/002372, filed Jan. 26, 2018, which claims priority to Japanese Patent Application No. 2017-013495, filed Jan. 27, 2017 and Japanese Patent Application No. 2017-248191, filed Dec. 25, 2017. Those applications are incorporated by reference in their entireties.

TECHNICAL FIELD

The present invention relates to a brushless field winding type rotary electrical machine disposed on an outer circumference of a starting apparatus.

BACKGROUND ART

As a conventional technique disclosed in JP 3445492 B2, a rotary electrical machine shown in FIG. 18 that supplies a magnetic flux from a field coil 102 that is stationary relative to a rotor 101 has been proposed. A stator 103 is disposed outside the rotor 101 in a radial direction. Such a structure makes it possible to eliminate the need for an electric power supply apparatus, the so-called slip ring using a brush conventionally required to magnetize the rotor 101. This results in a brushless field winding type rotary electrical machine 110. Note that a first air gap 111 is provided between the stator 103 and the rotor 101, and a second air gap 112 is provided between the field coil 102 and the rotor 101, both of which extend along an axial direction of a rotational axis 107.

Further, as disclosed in JP 2010-516558 T, a structure in which a rotary electrical machine is disposed on an outer circumference of a starting apparatus has been proposed. Such a structure makes it possible to start an engine by connecting the engine and the rotary electrical machine and to eliminate the need for a starter and an alternator required for a conventional automobile by causing the rotary electrical machine to function as a generator during traveling.

BRIEF SUMMARY

Combining these two Patent Documents, in other words, as shown in (b) of FIG. 7, when the brushless field winding type rotary electrical machine 110 is arranged on the outer circumference of the starting apparatus 104, three members of the stator 103 fixed to a case 105, the rotor 101, and the field coil 102 are arranged in a narrow space on an inner circumferential side of the case 105 and an outer circumferential side of the starting apparatus 104 coaxially with the rotational axis 107 with different diameters, in a combination of the structures disclosed in the two Patent Documents. Hence, there are drawbacks that a severe restriction is imposed on a volume occupied by the rotary electrical machine 110, a degree of freedom in designing is limited, and the output performance of the rotary electrical machine 110 is limited.

Accordingly, an object of the present invention, having been conceived to solve the problem, is to provide a rotary electrical machine that allows an increase in degree of freedom in designing and an increase in output performance.

In order to achieve the above-described object, the present invention is constructed as below.

According to one aspect of the present invention, there is provided a brushless field winding type rotary electrical machine disposed between an engine and a transmission along a rotational axis and positioned between a case housing a starting apparatus and the starting apparatus, includes:

a stator held by the case, the stator including therein an AC coil that generates a rotating magnetic field with an alternating current;

a field core held by the case, the field core including therein a field coil that is excited by a direct current;

a rotor disposed on an outer circumference of the starting apparatus and held rotatably about the rotational axis relative to the stator and the field coil;

a first air gap formed between the stator and the rotor, the first air gap being configured to allow a magnetic flux to flow between the stator and the rotor; and a second air gap formed between the field core and the rotor, the second air gap being configured to allow a magnetic flux to flow between the field core and the rotor and being an interval extending along a direction intersecting an axial direction of the rotational axis on one end surface of the rotor in the axial direction of the rotational axis.

According to the aspect of the present invention, in a narrow space on an inner circumferential side of the case and an outer circumferential side of the starting apparatus, only the stator or the field coil other than the rotor is disposed, which only requires two members to be arranged on diameters that are coaxial with the rotational axis but different from each other, and thus allows an increase in the degree of freedom in designing and an increase in the output performance of the rotary electrical machine.

BRIEF DESCRIPTION OF THE DRAWINGS

These and other aspects and features of the present invention will become clear from the following description taken in conjunction with the embodiments thereof with reference to the accompanying drawings, in which:

FIG. 12A is an explanatory diagram showing a cross-sectional view taken approximately along a direction orthogonal to a rotational axis of a rotary electrical machine according to a third embodiment of the present invention and an arrangement relation of the rotary electrical machine relative to an engine and a transmission;

DETAILED DESCRIPTION

Hereinafter, embodiments of the present invention will be described in detail with reference to the drawings.

First Embodiment

Figure 1:
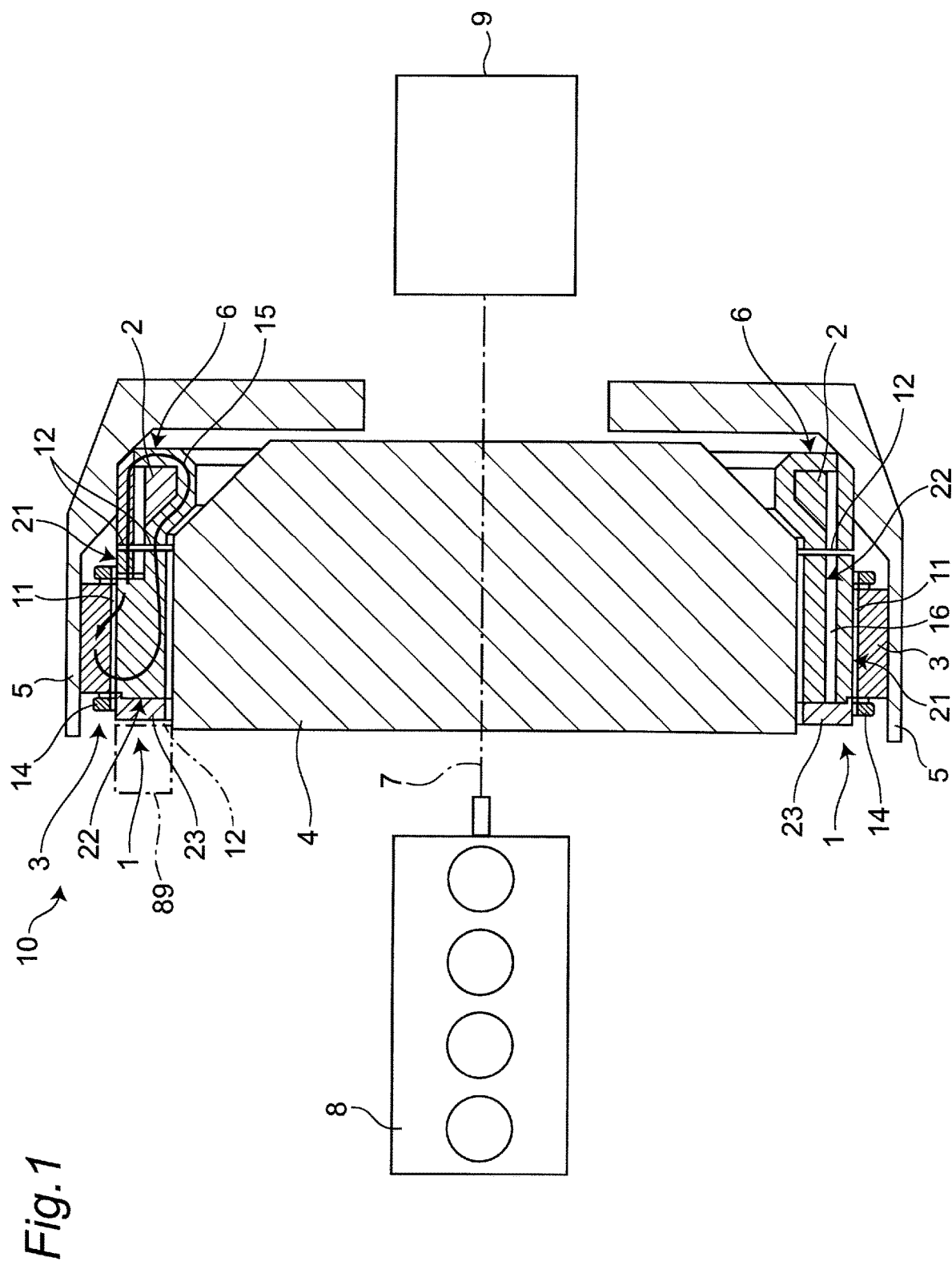
FIG. 1 is an explanatory diagram showing a cross-sectional view taken approximately along a direction orthogonal to a rotational axis of a rotary electrical machine according to a first embodiment of the present invention and an arrangement relation of the rotary electrical machine relative to an engine and a transmission.
Figure 2A:
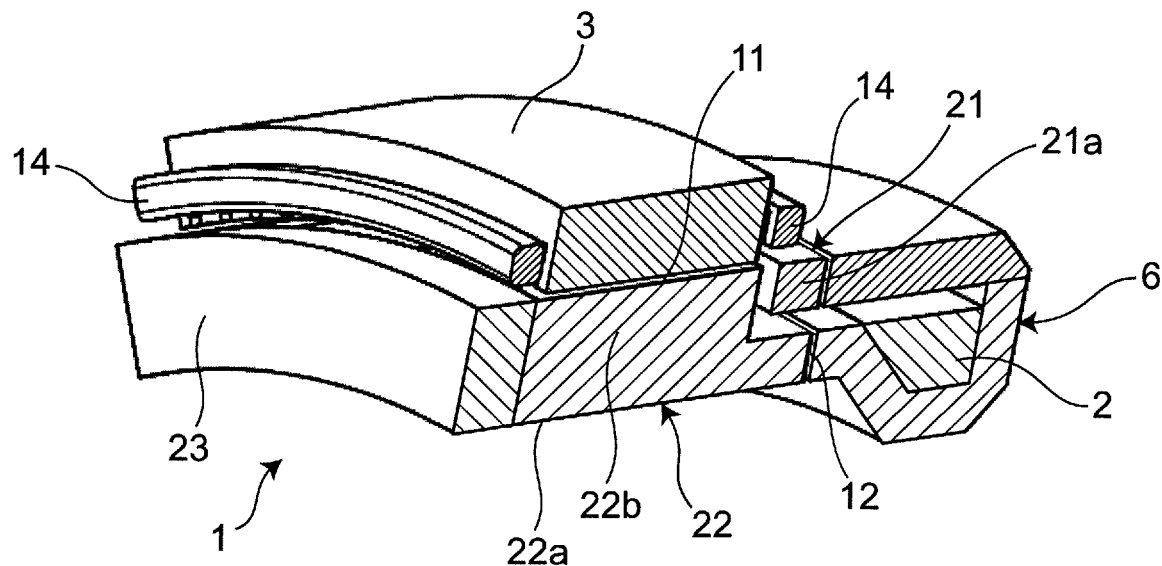
FIG. 2A is a perspective view of the rotary electrical machine according to the first embodiment, taken along the direction orthogonal to the rotational axis of the rotary electrical machine.
Figure 2B:
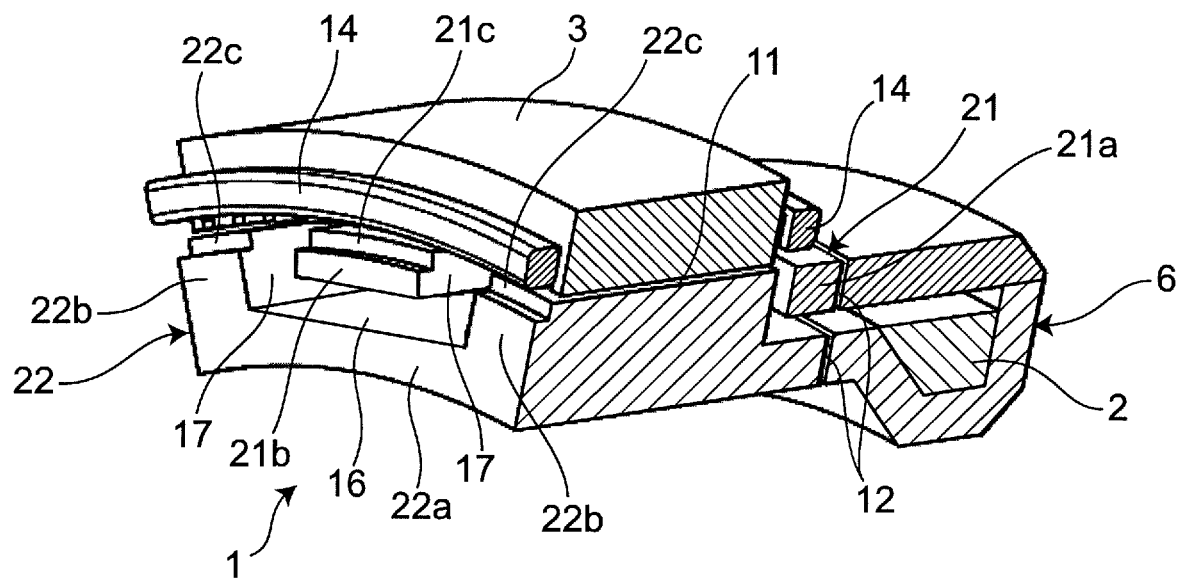
FIG. 2B is a perspective view of the rotary electrical machine of FIG. 2A without a magnetic pole holding member.
Figure 3:
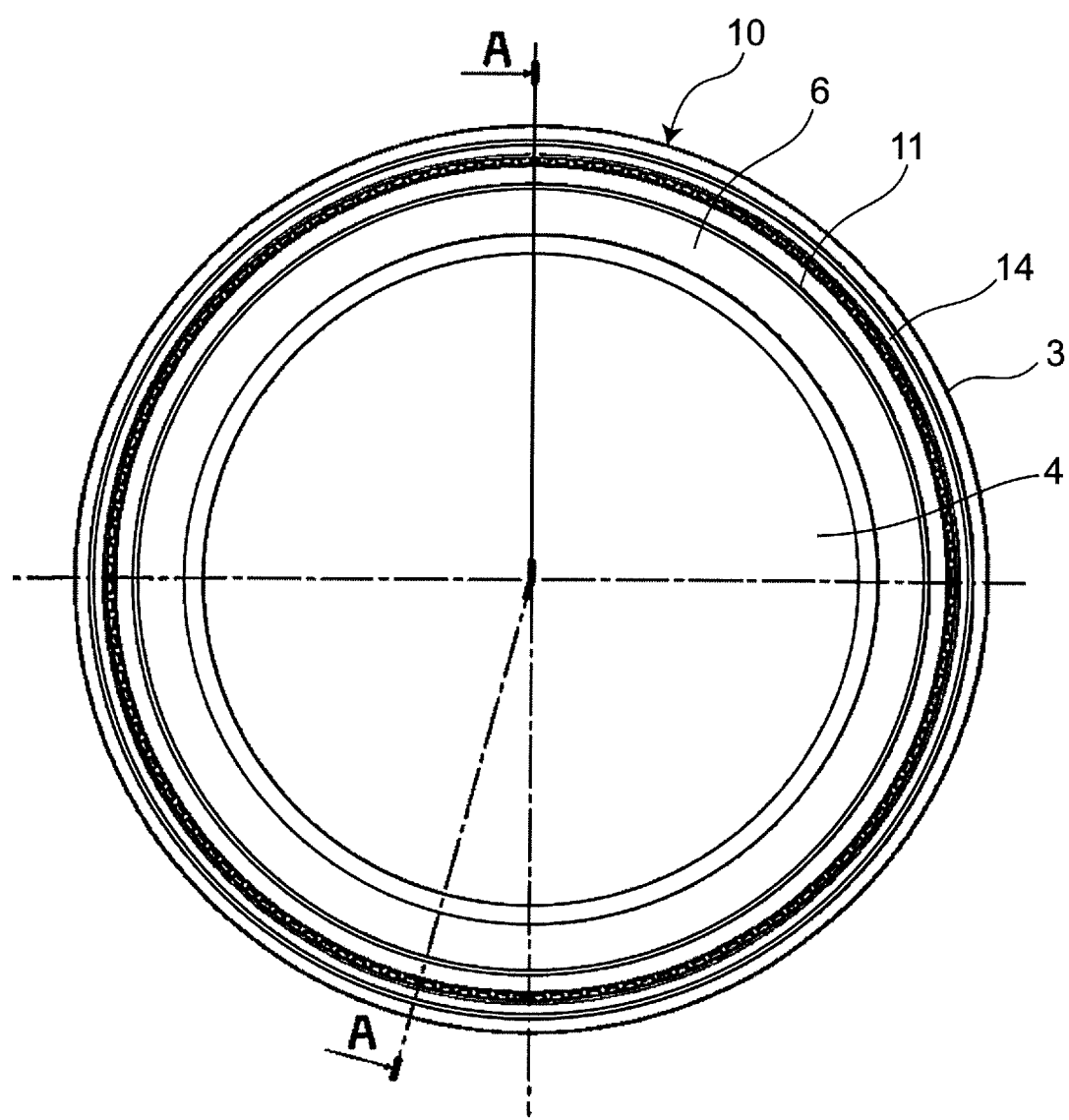
FIG. 3 is a front view of the rotary electrical machine according to the first embodiment, as viewed from a transmission side.
Figure 4:
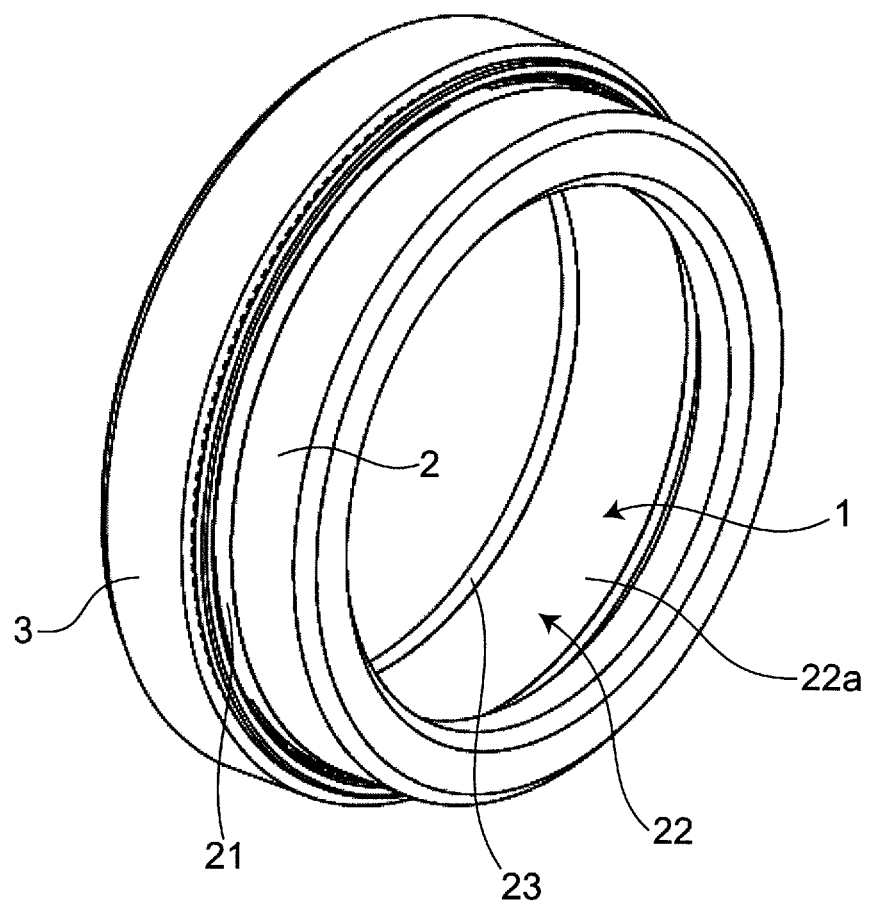
FIG. 4 is a perspective view of the rotary electrical machine according to the first embodiment.

As shown in FIGS. 1 to 2B, a rotary electrical machine according to a first embodiment of the present invention is a brushless field winding type rotary electrical machine 10 that is disposed between an engine 8 and a transmission 9 along a rotational axis 7 and is positioned between a case 5 housing a starting apparatus 4 and the starting apparatus 4. The rotary electrical machine 10 includes at least a stator 3, a field coil 2, and a rotor 1.

The stator 3 is fixedly held by the case 5 in a non-rotatable manner and is configured by a cylindrical member having a plurality of slots on which an AC coil 14 is wound. The stator 3 includes the AC coil 14 therein and generates a rotating magnetic field with an alternating current flowing through the AC coil 14.

The field coil 2 is shifted along the rotational axis 7 relative to the stator 3 and the rotor 1, fixedly held by the case 5 on a side adjacent to the transmission 9 of the stator 3, and is excited by a direct current. A field core 6 includes the field coil 2 therein. Note that the field coil 2 can be shifted along the rotational axis 7 relative to the stator 3 and the rotor 1 and on a side adjacent to the engine of the stator 3 via a second air gap 12 rather than on a side adjacent to the transmission 9 of the stator 3 (see a region 89 enclosed by a long dashed short dashed line in FIG. 1).

The rotor 1 is fixedly disposed on an outer circumference of the starting apparatus 4 such that an outer circumferential surface of the rotor 1 faces an inner circumferential surface of the stator 3, and an end surface adjacent to the transmission of the rotor 1 faces an end surface adjacent to the engine of the field coil 2. The rotor 1 is held rotatably about the rotational axis 7 relative to the stator 3 and the field coil 2.

The first air gap 11 is formed between the stator 3 and the rotor 1 and allows a magnetic flux to flow between the stator 3 and the rotor 1. The first air gap 11 is an interval extending along an axial direction of the rotational axis 7 between the inner circumferential surface of the stator 3 and the outer circumferential surface of the rotor 1.

The second air gap 12 is formed between the field core 6 and the rotor 1 and allows a magnetic flux to flow between the field coil 2 and the rotor 1. The second air gap 12 is an interval extending along a direction intersecting the axial direction of the rotational axis 7, for example, along a radial direction orthogonal to the axial direction between the field core 6 and the rotor 1 on the end surface adjacent to the transmission of the rotor 1 and on an end surface adjacent to the engine of the field core 6 in the axial direction of the rotational axis 7.

Accordingly, the field coil 2 is shifted in the axial direction of the rotational axis 7 to be in parallel to the rotor 1 with the second air gap 12 interposed between the field coil 2 and the rotor 1.

On the other hand, as shown in FIGS. 3 to 6, the rotor 1 is composed of a combination of a first magnetic pole 21, a second magnetic pole 22, and a magnetic pole holding member 23. Note that a longitudinal cross-sectional view taken along line A-A of FIG. 3 corresponds to a cross-sectional view of the rotary electrical machine 10, the starting apparatus 4, and the like shown in the center of FIG. 1.

The first magnetic pole 21 is composed of a soft magnetic material such as iron and has a plurality of claw portions 21b each of which has, for example, a rectangular thin plate shape and protrude from a first annular portion 21a in the axial direction of the rotational axis 7. The claw portions 21b are arranged at regular intervals, for example, equal intervals, in a circumferential direction thereof and all have the same length in the axial direction of the rotational axis 7. An outer circumferential surface of each of the claw portions 21b is flush with an outer circumferential surface of the first annular portion 21a. When the first magnetic pole 21 and the second magnetic pole 22 are combined, the claw portions 21b are kept from coming into contact with the second magnetic pole 22, and a radial interval 16 is formed extending in the radial direction.

Figure 5:
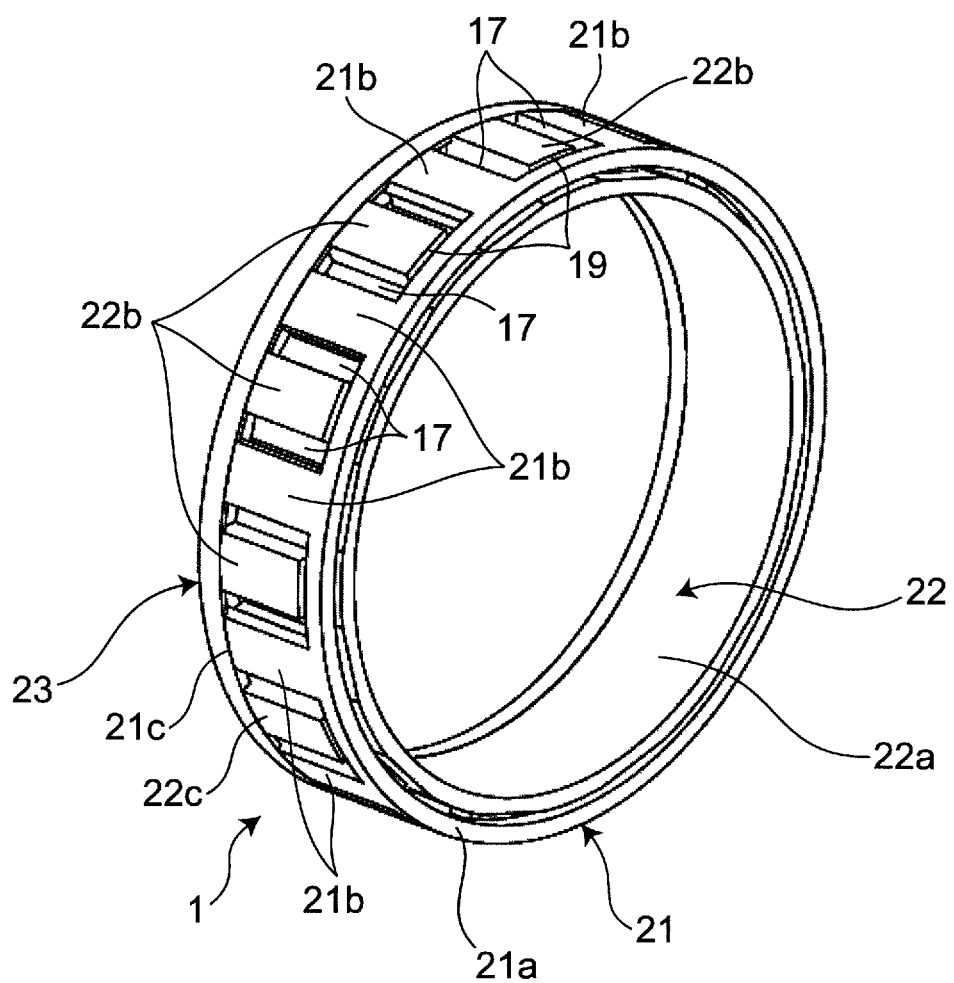
FIG. 5 is a perspective view of a rotor of the rotary electrical machine according to the first embodiment.
Figure 6:
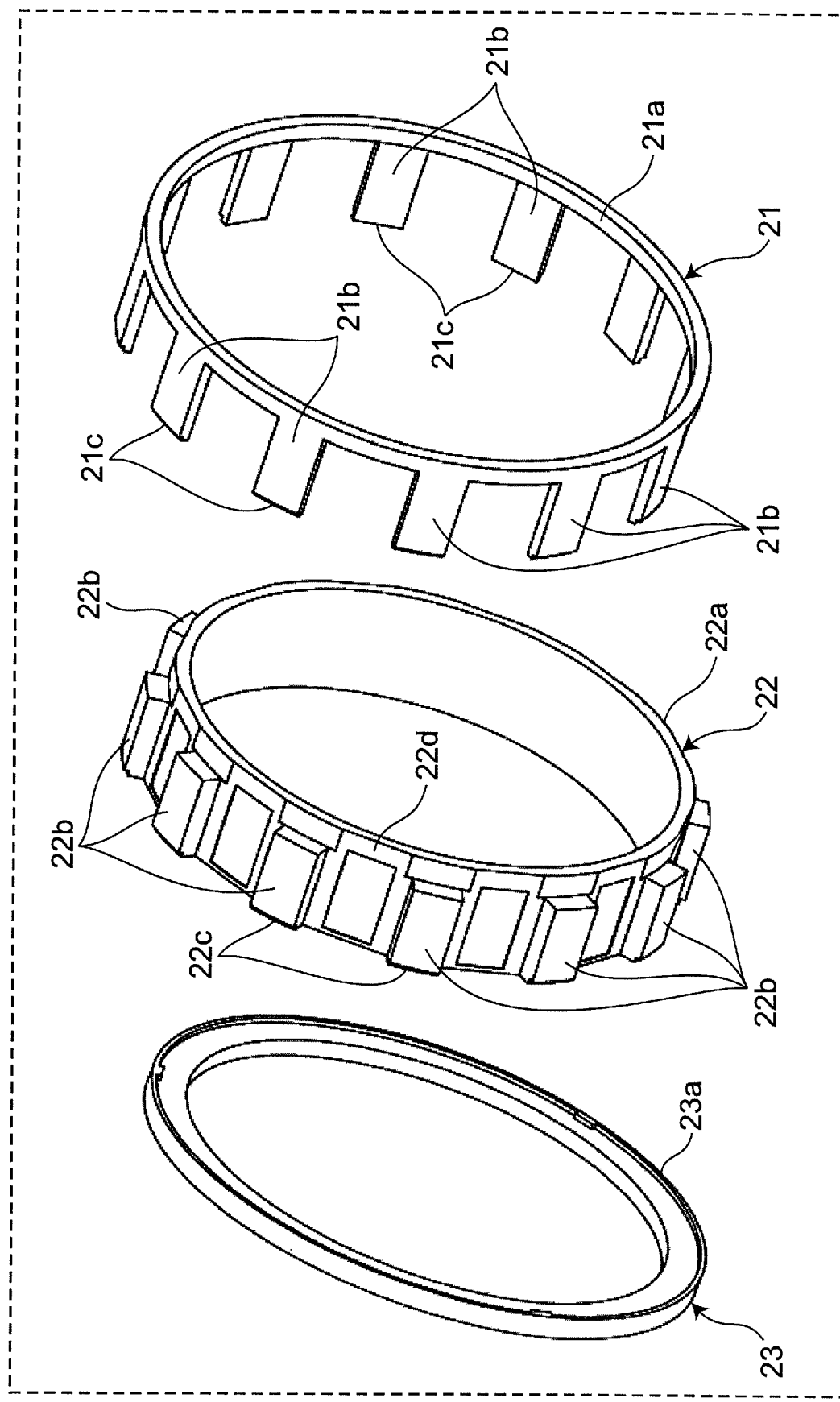
FIG. 6 is an exploded perspective view of the rotor of the rotary electrical machine according to the first embodiment.

The second magnetic pole 22 is composed of a soft magnetic material such as iron and is disposed inside the first annular portion 21a with the radial interval 16 interposed therebetween. The second magnetic pole 22 has a plurality of protrusions 22b each of which has, for example, a rectangular plate shape, protrude in the radial direction, and are arranged on an outer circumferential surface of a second annular portion 22a at circumferential intervals 17 in the circumferential direction. The second annular portion 22a is disposed partially overlapping the first annular portion 21a. The protrusions 22b are also arranged at regular intervals, for example, equal intervals, in the circumferential direction and all have the same height in the radial direction. The protrusions 22b all have the same length in the axial direction of the rotational axis 7 and are shorter in length than the claw portions 21b. An outer circumferential surface of each of the protrusions 22b is disposed on a circle coaxial with a rotation axis of the rotor 1. Each of the protrusions 22b extends to an end edge adjacent to the engine of the second annular portion 22a to form a second leading end locking portion 22c while extending toward but terminating short of an end edge adjacent to the transmission of the second annular portion 22a to form an inserting portion 22d having a thin annular shape without the protrusion 22b. The first magnetic pole 21 is moved in the axial direction relative to the second magnetic pole 22 to insert each of the claw portions 21b of the first magnetic pole 21 into a middle part of the circumferential interval 17 between the protrusions 22b adjacent to each other, thereby combining the first magnetic pole 21 and the second magnetic pole 22 with the claw portion 21b and the protrusion 22b alternately arranged in the circumferential direction. The first annular portion 21a of the first magnetic pole 21 is configured to be disposed outward the inserting portion 22d with the radial interval 16 interposed therebetween. As shown in FIG. 5, with the first magnetic pole 21 and the second magnetic pole 22 combined with each other, an axial interval 19 is present between each of the protrusions 22b and the first annular portion 21a, and, between each of the claw portions 21b and the second magnetic pole 22, the circumferential interval 17 in the circumferential direction and the radial interval 16 in the radial direction are present. Accordingly, the first magnetic pole 21 and the second magnetic pole 22 are kept from coming into contact with each other. In order to fix the first magnetic pole 21 and the second magnetic pole 22 to each other in this state, the magnetic pole holding member 23 is further provided.

The magnetic pole holding member 23 is composed of a nonmagnetic material such as aluminum or austenitic stainless steel and is an annular member. The magnetic pole holding member 23 has a fitting portion 23a, for example, on an outer circumferential side. To the fitting portion 23a, a first leading end locking portion 21c of each of the claw portions 21b of the first magnetic pole 21 and the second leading end locking portion 22c of each of the protrusions 22b of the second magnetic pole 22 are fixedly fitted. The first leading end locking portion 21c and the second leading end locking portion 22c are fitted to the fitting portion 23a and fixed by bolting, shrink fitting, brazing, or the like, so that the first magnetic pole 21 and the second magnetic pole 22 are fixedly held by the magnetic pole holding member 23 with the first magnetic pole 21 and the second magnetic pole 22 kept from coming into contact with each other.

As a specific example, the first leading end locking portion 21c of each of the claw portions 21b of the first magnetic pole 21 and the second leading end locking portion 22c of each of the protrusions 22b of the second magnetic pole 22 are each formed in a step portion, and the step portion is fitted to an engaging recess of the fitting portion 23a and fixedly held in the radial direction. The second leading end locking portion 22c is disposed at a leading end of each of the protrusions 22b as an example, but can be disposed at a leading end of the second annular portion 22a. When the magnetic flux is made to flow from the field coil 2 to magnetize the first magnetic pole 21 and the second magnetic pole 22, this configuration achieves efficient magnetization by causing the magnetic pole holding member 23 that is nonmagnetic to prevent a magnetic short, and allows the first magnetic pole 21 and the second magnetic pole 22 to be mechanically held by the magnetic pole holding member 23. Further, the configuration in which the first leading end locking portion 21c of each of the claw portions 21b of the first magnetic pole 21 is fixedly fitted to and held by the fitting portion 23a of the magnetic pole holding member 23 suppresses outward deformation of the claw portions 21b due to a rotational centrifugal force, and thus makes it possible to increase rotational strength.

In the rotary electrical machine 10 configured as described above, when the field coil 2 is energized, a field coil magnetic flux 15 is generated. The field coil magnetic flux 15 passes from the field core 6 through the second air gap 12, the first magnetic pole 21 of the rotor 1, the first air gap 11, the stator 3, the first air gap 11, the second magnetic pole 22 of the rotor 1, and the second air gap 12 and returns to the field core 6. At this time, for example, when a direct current is made to flow through the field coil 2, the field coil magnetic flux 15 is generated, thereby magnetizing the first magnetic pole 21 and the second magnetic pole 22 to N pole and S pole, respectively.

A description will be given of a configuration where such a rotary electrical machine 10 serves as a starter to perform a start function. In accordance with a command to start the engine 8, an inverter (not shown) is driven to cause a three-phase alternating current flow through the stator 3 to magnetize the stator 3 and to cause a current flow through the field coil 2. Causing the current flow through the field coil 2 excites the first magnetic pole 21 and the second magnetic pole 22 of the rotor 1. As a result, the rotor 1 starts to rotate relative to the stator 3, and an electromotive force having an induced voltage is generated in the stator 3.

Thereafter, the induced voltage increases according to a rotation speed of the rotor 1, and when the rotation speed reaches an initial explosion rotation speed lower than an idling speed corresponding to idling of the engine 8, the driving of the inverter is stopped, and thereafter, the rotary electrical machine 10 automatically shifts to a power generation mode, in other words, a mode where the rotary electrical machine 10 serves as a dynamo to perform a power generating function, so as to hold a predetermined induced voltage (required voltage).

In the power generation mode, when the field coil 2 continues to excite, an excitation current is adjusted to make the induced voltage constant at a predetermined induced voltage. When the excitation current is adjusted, the excitation current is first adjusted to make a magnetizing force of the field coil 2 constant. This is an intention of making the field coil 2 function just like a permanent magnet. As described above, when the rotor 1 rotates in a state as if a permanent magnet is disposed, the rotary electrical machine 10 functions as a dynamo.

As a result, connecting the engine 8 and the rotary electrical machine 10 allows the engine to start and allows the rotary electrical machine 10 to function as a generator (dynamo) during traveling.

According to the first embodiment, in the brushless field winding type rotary electrical machine 10 disposed on the outer circumference of the automobile starting apparatus 4, the second air gap 12 between the field coil 2 and the rotor 1 is formed on a plane perpendicular to the rotational axis 7. Specifically, employed is a structure in which the first magnetic pole 21 of the rotor 1 is an annular member having a large number of the claw portions 21b, the second magnetic pole 22 is an annular member having a large number of the protrusions 22b, and the first and second magnetic poles 21, 22 are alternately arranged in the circumferential direction and held by the magnetic pole holding member 23 made of a nonmagnetic material. Such a configuration can exhibit the following effects.

Figure 7:
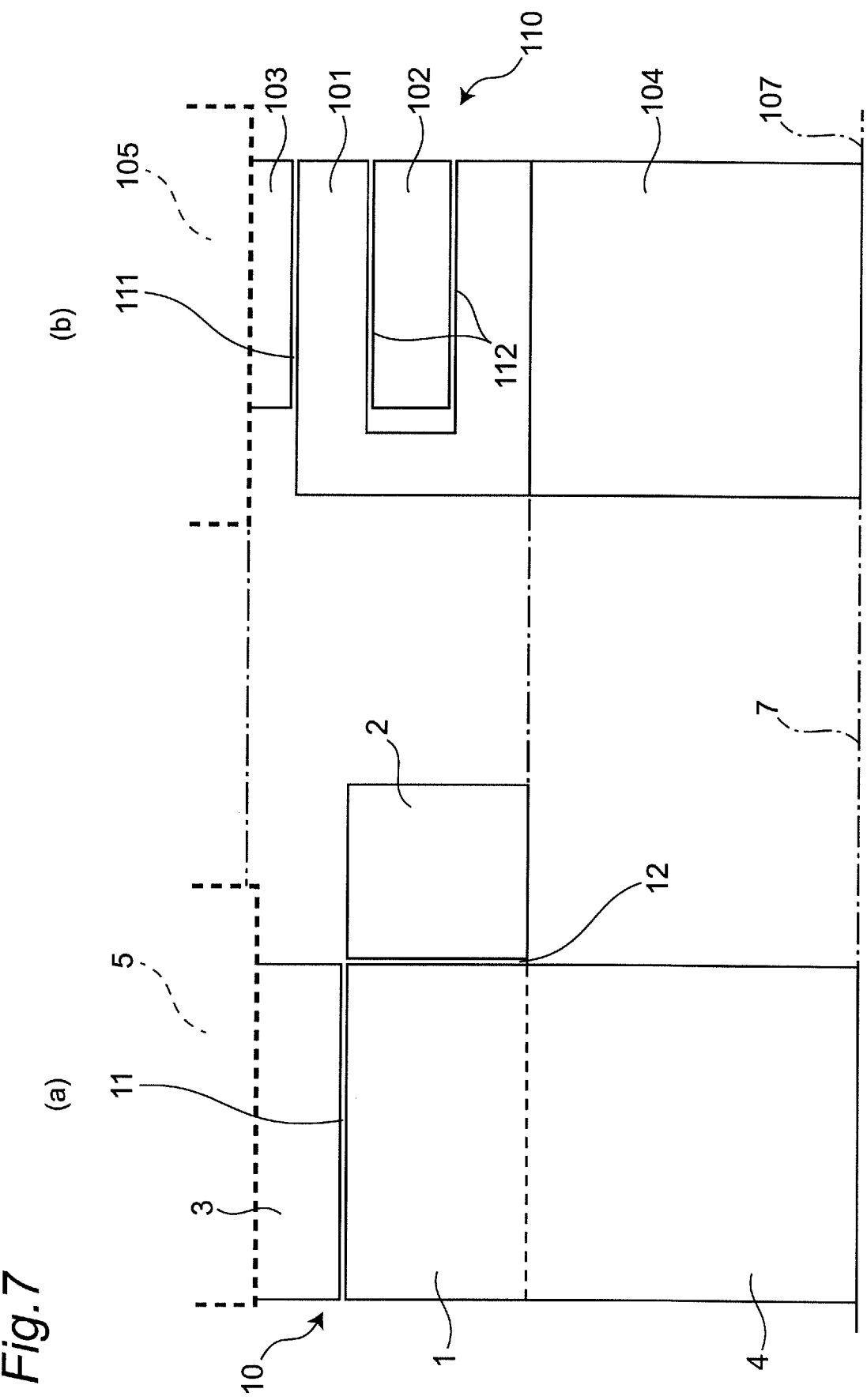
FIG. 7 is an explanatory diagram showing a relation between a configuration of the first embodiment and a configuration of a combination example of conventional documents.

First, as shown in (b) of FIG. 7 as a combination example of conventional JP 3445492 B2 and JP 2010-516558 T that is a comparative example to the first embodiment, when the rotary electrical machine 110 is disposed outside the starting apparatus 104 in the radial direction, and three members of the stator 103, the rotor 101, and the field coil 102 are arranged in a space between the case 105 and the starting apparatus 104 from the outside to the inside in the radial direction, the more the number of turns of the field coil 102 increases to increase the magnetic flux of the field coil 102, the more the thickness in the radial direction increases, which makes it unable to put the three members into the space and accordingly fails to increase the magnetic flux.

On the other hand, in the first embodiment, as shown in (a) of FIG. 7, employed is a configuration in which the field coil 2 is shifted in the axial direction of the rotational axis 7 to be in parallel to the stator 3 and the rotor 1. This configuration causes only the two members of the stator 3 and the rotor 1 to be present outside the starting apparatus 4 in the radial direction, which eliminates the need for a space for disposing the field coil 2 outside the starting apparatus 4 in the radial direction. Accordingly, it is possible to reduce the radial dimension of the outside of the starting apparatus 4 by at least the space for disposing the field coil 2 or increase the thickness of the stator 3 or the rotor 1 by the space for disposing the field coil 2, for example, for effective use of the space for disposing the field coil 2. Further, since the field coil 2 is disposed at a position shifted in the axial direction relative to the stator 3 and the rotor 1, it is possible to increase the thickness of the field coil 2 in the radial direction to increase the magnetic flux of the field coil 2 without considering the space for the stator 3 and the rotor 1. This makes it possible to increase the degree of freedom in designing.

Further, as shown in (b) of FIG. 7, when the stator 103, the rotor 101, and the field coil 102 are arranged in that order from the outside to the inside in the radial direction, it is required that a dimension of an interval between the rotor 101 and the field coil 102 to be designed in consideration of the change in thickness caused by expansion or the like due to the centrifugal force applied to the rotor 101 and to be generally designed larger than a required dimension.

On the other hand, as shown in (a) of FIG. 7, the field coil 2 is shifted relative to the stator 3 and the rotor 1 in the axial direction to form an interval radially extending between the field coil 2 and the rotor 1 as the second air gap 12, which eliminates the need to take into consideration the change in thickness caused by expansion or the like due to the centrifugal force applied to the rotor 1, and only requires adjustment of the interval dimension of the second air gap 12 along the axial direction. Therefore, the influence of the centrifugal force can be reduced.

Further, in the radial arrangement as shown in (b) of FIG. 7, concentricity (position adjustment of concentric positions) between the rotor 101 that is a rotating side and the field coil 102 that is a stationary side is strictly adjusted; however, as shown in (a) of FIG. 7, when the field coil 102 is shifted in the axial direction, there is no need to adjust the concentricity between the rotor 1 that is the rotating side and the field coil 2 that is the stationary side as strict as the configuration in (b) of FIG. 7.

Further, in the configuration in (a) of FIG. 7, allowing the field coil 2 of the rotor 1 to be disposed in either a space adjacent to the engine or a space adjacent to the transmission in the axial direction makes it possible to use the space effectively.

Further, the rotor 1 of the rotary electrical machine 10 is connected to the starting apparatus 4 that is a synchronous rotating member synchronously rotating with an output shaft (rotational shaft) 7 of the engine 8, and the rotary electrical machine 10 is disposed so that the center axis of the output shaft of the engine 8 is aligned with a rotation axis of the rotor 1, which makes it possible to surely transmit a rotational driving force of the rotary electrical machine 10 to the engine 8 even in a cold state and surely start the engine 8 in the cold state.

Figure 8:
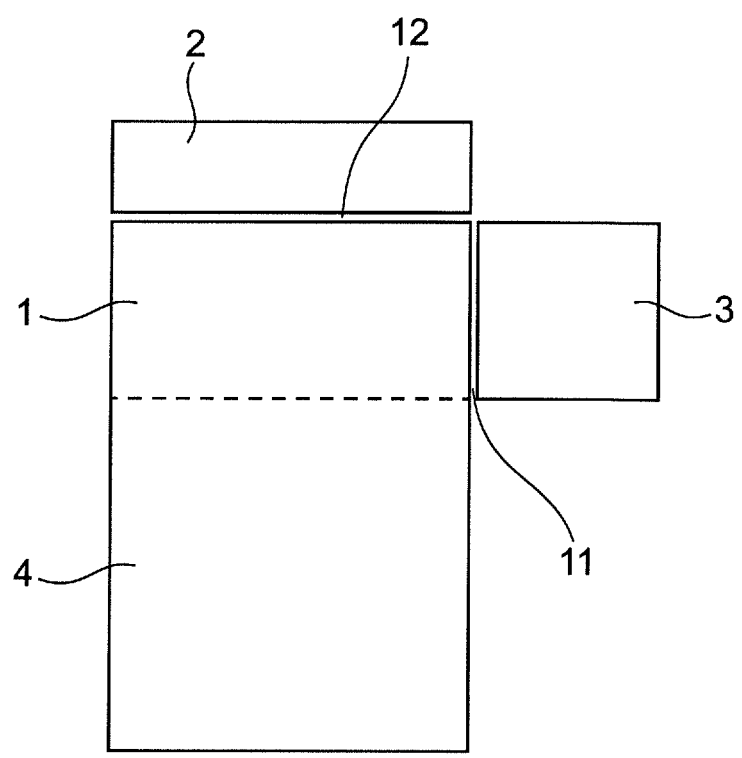
FIG. 8 is an explanatory diagram showing a configuration according to a modification of the first embodiment.

Note that the present invention is not limited to the first embodiment and can be implemented in various other modes. For example, as a modification shown in FIG. 8, in the first embodiment, an interchange in position between the stator 3 and the field coil 2 can be made to cause the field coil 2 to be disposed on an outer side in the radial direction of the rotor 1 and cause the stator 3 to be shifted in the axial direction of the rotational axis 7 relative to the rotor 1. In other words, the first air gap 11 between the rotor 1 and the stator 3 is formed as an interval extending along a direction intersecting the axial direction of the rotational axis 7, for example, along the radial direction orthogonal to the axial direction. On the other hand, the second air gap 12 between the field coil 2 and the rotor 1 is formed as an interval extending along the axial direction of the rotational axis 7.

This configuration not only exhibits the action effect of the first embodiment, but also causes the first air gap 11 between the rotor 1 and the stator 3 to be formed as an interval extending along the radial direction orthogonal to the axial direction of the rotational axis 7, which eliminates the need to take into consideration the change in thickness caused by expansion or the like due to the centrifugal force applied to the rotor 1 in designing the stator 3.

Second Embodiment

Figure 9:
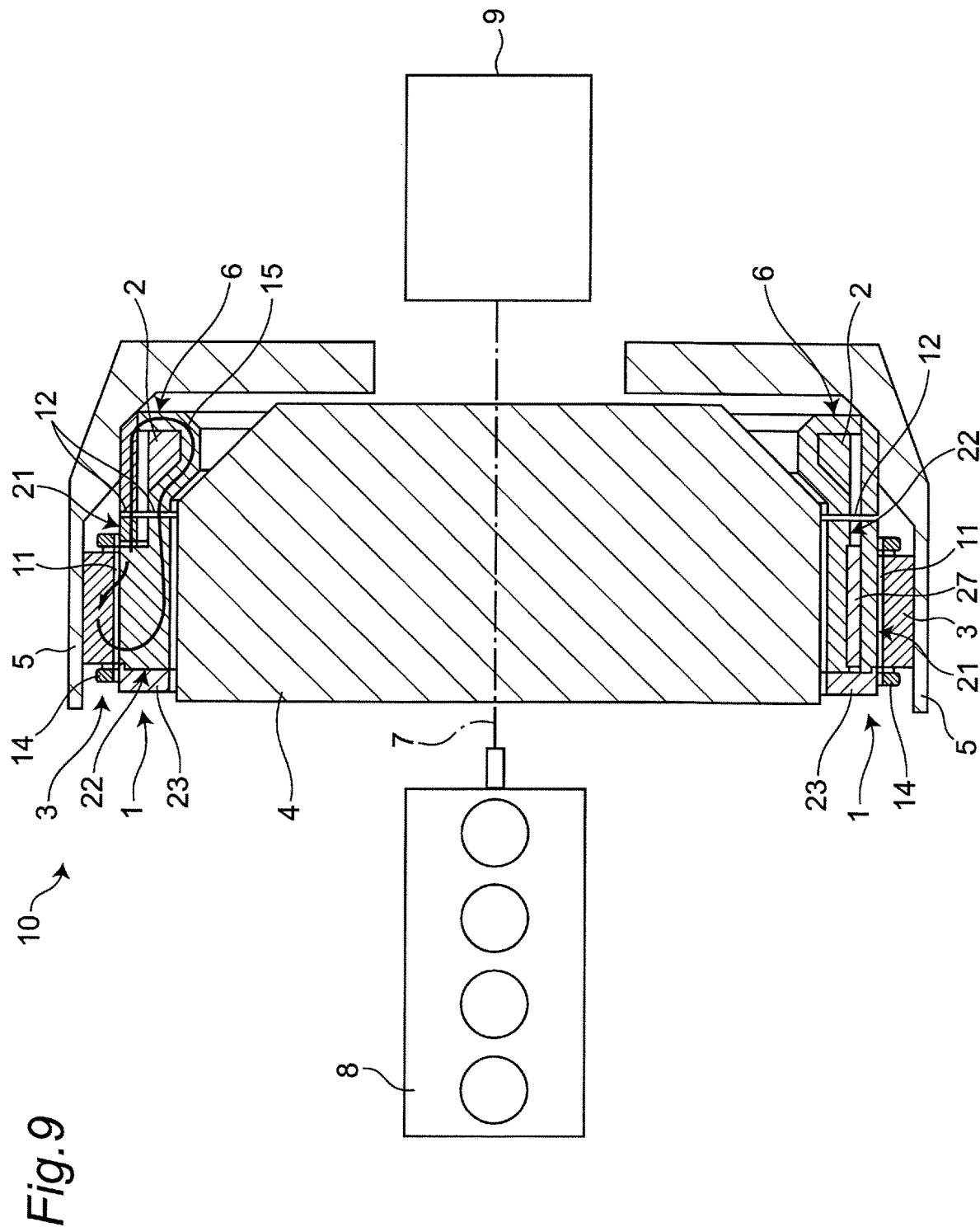
FIG. 9 is an explanatory diagram showing a cross-sectional view taken approximately along a direction orthogonal to a rotational axis of a rotary electrical machine according to a second embodiment of the present invention and an arrangement relation of the rotary electrical machine relative to an engine and a transmission.
Figure 10:
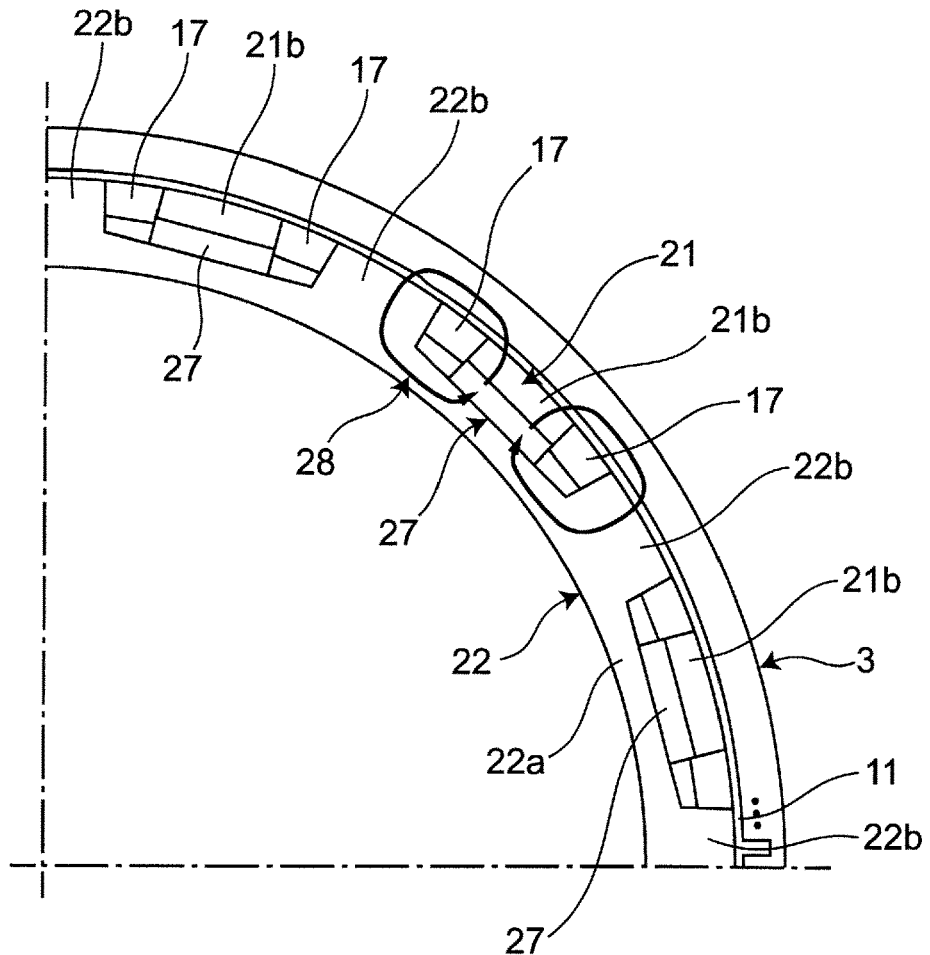
FIG. 10 is a partial front view of the rotary electrical machine according to the second embodiment.
Figure 11:
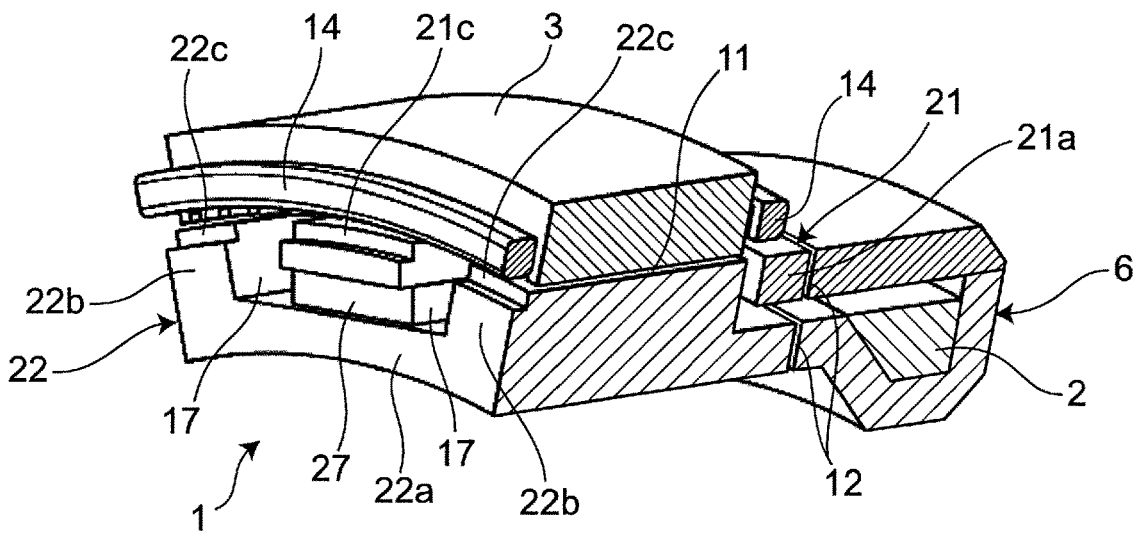
FIG. 11 is a perspective view of the rotary electrical machine according to the second embodiment without a magnetic pole holding member, taken along the direction orthogonal to the rotational axis of the rotary electrical machine.

As shown in FIGS. 9 to 11, a second embodiment of the present invention can have a structure in which a permanent magnet 27 is disposed inside the rotor 1 in the configuration of the first embodiment.

More specifically, the permanent magnet 27 having, for example, a rectangular plate shape is provided at the same circumferential position as each of the claw portions 21b of the first magnetic pole 21 is disposed, on an inner diameter side of each of the claw portions 21b of the first magnetic pole 21 and on an outer diameter side of the second annular portion 22a of the second magnetic pole 22, and is sandwiched between an inner circumferential surface of each of the claw portions 21b and the outer circumferential surface of the second annular portion 22a. This arrangement causes, as shown in FIG. 10, a magnet magnetic flux 28 of the permanent magnet 27 to be formed between each of the claw portions 21b of the first magnetic pole 21 and the protrusions 22b of the second magnetic pole 22.

The permanent magnet 27 is a magnet primarily made of neodymium or a magnet primarily made of ferrite. Specifically, as the permanent magnet 27, various kinds of permanent magnets such as a SmCo magnet, an AlNiCo magnet, a neodymium bonded magnet, and the like can be used. The permanent magnet 27 is disposed entirely or partially an inner surface of each of the claw portions 21b.

Such a configuration makes it possible to increase output performance by using the magnet magnetic flux 28 of the permanent magnet 27 in addition to a magnetic flux generated in the rotor 1 by the field coil 2. Further, holding the permanent magnet 27 with the claw portions 21b makes it possible to increase strength of the permanent magnet 27 against a centrifugal force, which can prevent the permanent magnet 27 from being deformed due to the centrifugal force and thus increase centrifugal strength during high speed rotation.

Third Embodiment

The second air gap 12 is not limited to an interval extending along the radial direction orthogonal to the axial direction of the rotational axis 7 as described in the first and second embodiments, and can be an interval inclined from the axis direction of the rotational axis 7. An example having such an interval will be described below.

As shown in FIGS. 12A to 13B, a rotary electrical machine according to a third embodiment of the present invention is a brushless field winding type rotary electrical machine 10 that is disposed between an engine 8 and a transmission 9 along a rotational axis 7 and is positioned between a case 5 housing a starting apparatus 4 and the starting apparatus 4. The rotary electrical machine 10 includes at least a stator 3, a field coil 2, and a rotor 1.

The stator 3 is fixedly held by the case 5 in a non-rotatable manner and is configured by a cylindrical member having a plurality of slots on which an AC coil 14 is wound. The stator 3 includes the AC coil 14 therein and generates a rotating magnetic field with an alternating current flowing through the AC coil 14.

The field coil 2 is shifted along the rotational axis 7 relative to the stator 3 and the rotor 1, fixedly held by the case 5 on a side adjacent to the transmission 9 of the stator 3, and is excited by a direct current. A field core 6 includes the field coil 2 therein. Note that the field coil 2 can be disposed closer to the engine than the stator 3 and the rotor 1 along the rotational axis 7, that is, on a side adjacent to the engine of the stator 3 via a second air gap 212 rather than on a side adjacent to the transmission 9 of the stator 3 (see a region 89 enclosed by a long dashed short dashed line in FIG. 12A).

The rotor 1 is fixedly disposed on an outer circumference of the starting apparatus 4 such that an outer circumferential surface of the rotor 1 faces an inner circumferential surface of the stator 3, and an end surface adjacent to the transmission of the rotor 1 faces an end surface adjacent to the engine of the field coil 2. The rotor 1 is held rotatably about the rotational axis 7 relative to the stator 3 and the field coil 2.

The first air gap 11 is formed between the stator 3 and the rotor 1 and allows a magnetic flux to flow between the stator 3 and the rotor 1. The first air gap 11 is an interval extending along an axial direction of the rotational axis 7 between the inner circumferential surface of the stator 3 and the outer circumferential surface of the rotor 1.

The second air gap 212 is formed between the field core 6 and the rotor 1 and allows a magnetic flux to flow between the field coil 2 and the rotor 1. The second air gap 212 is an interval inclined from the axial direction of the rotational axis 7 at an inclination angle α between the field core 6 and the rotor 1 on the end surface adjacent to the transmission of the rotor 1 and on an end surface adjacent to the engine of the field core 6 in the axial direction of the rotational axis 7.

Figure 13A:
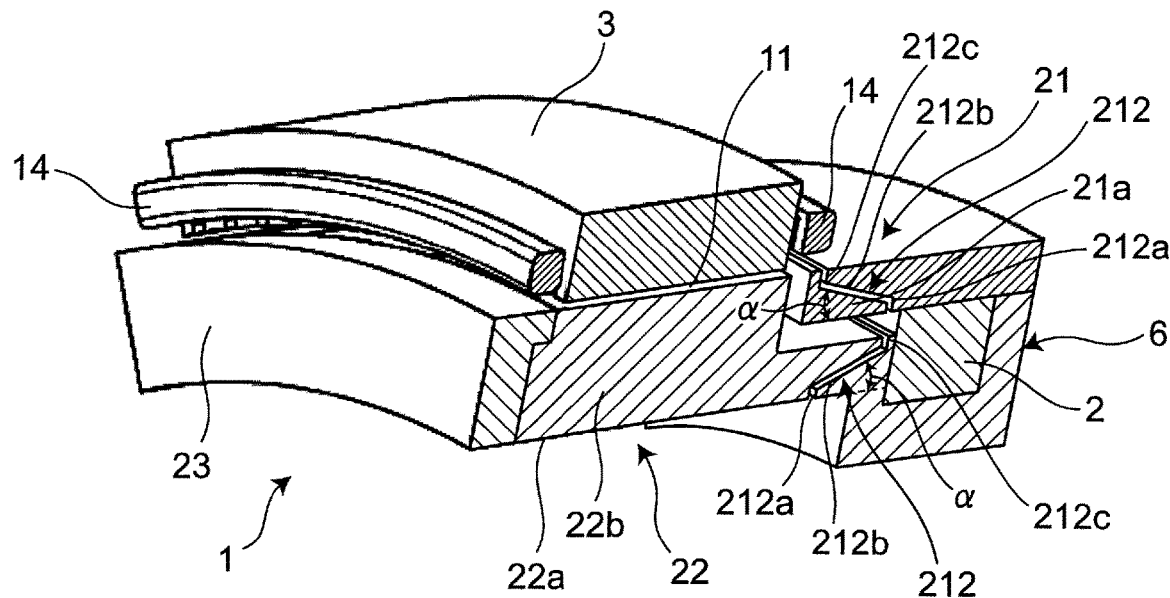
FIG. 13A is a perspective view of the rotary electrical machine according to the third embodiment, taken along the direction orthogonal to the rotational axis of the rotary electrical machine.
Figure 13B:
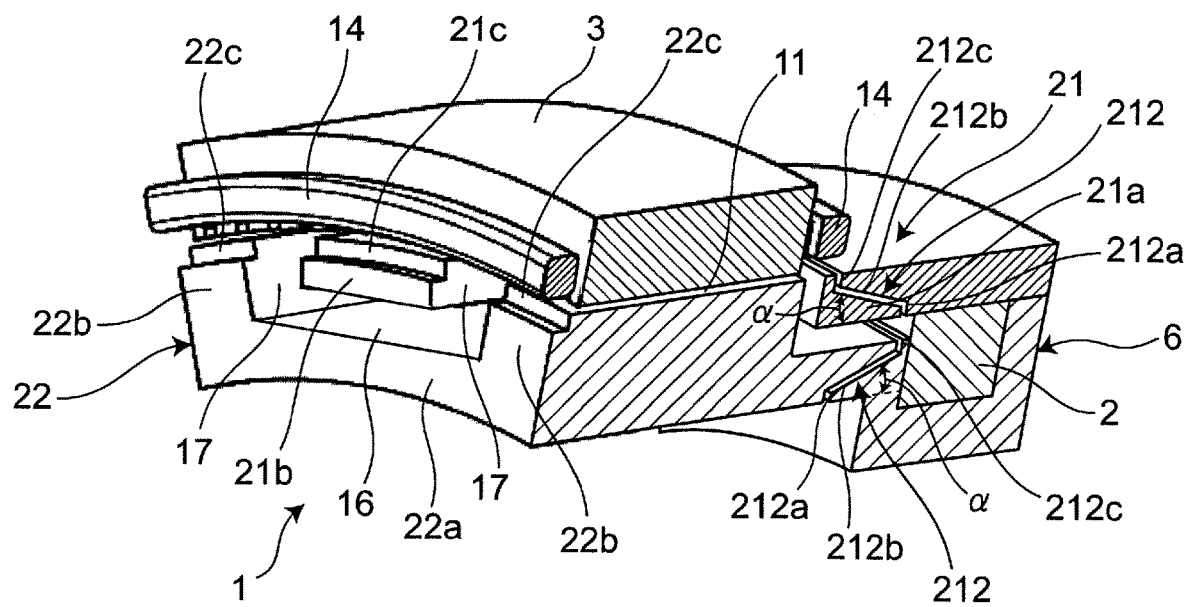
FIG. 13B is a perspective view of the rotary electrical machine of FIG. 13A without a magnetic pole holding member.

More specifically, as shown in FIG. 13A, the second air gap 212 is formed between the field core 6 and the second magnetic pole 22 of the rotor 1 on the end surface adjacent to the transmission of the rotor 1 and on the end surface adjacent to the engine of the field core 6 in the axial direction of the rotational axis 7, and between the field core 6 and the first magnetic pole 21 of the rotor 1 on the end surface adjacent to the transmission of the rotor 1 and on the end surface adjacent to the engine of the field core 6 in the axial direction of the rotational axis 7.

First, between the field core 6 and the second magnetic pole 22 of the rotor 1, on the end surface adjacent to the transmission of the rotor 1 and on the end surface adjacent to the engine of the field core 6 in the axial direction of the rotational axis 7, the second air gap 212 includes a first perpendicular portion 212a that is an interval perpendicular to the axial direction of the rotational axis 7, an inclined portion 212b that is an interval inclined from the axial direction of the rotational axis 7 at the inclination angle α, and a second perpendicular portion 212c that is an interval perpendicular to the axial direction of the rotational axis 7 in that order from a center of the rotational axis 7. The first perpendicular portion 212a, the inclined portion 212b, and the second perpendicular portion 212c are continuously connected to each other. An inclination direction of the inclined portion 212b is gradually inclined from the inside to the outside in the radial direction as advancing from the engine side to the transmission side. The intervals of the first perpendicular portion 212a, the inclined portion 212b, and the second perpendicular portion 212c are approximately the same.

Further, between the field core 6 and the first magnetic pole 21 of the rotor 1, on the end surface adjacent to the transmission of the rotor 1 and on the end surface adjacent to the engine of the field core 6 in the axial direction of the rotational axis 7, the second air gap 212 includes a first perpendicular portion 212a that is an interval perpendicular to the axial direction of the rotational axis 7, an inclined portion 212b that is an interval inclined from the axial direction of the rotational axis 7 at the inclination angle α, and a second perpendicular portion 212c that is an interval perpendicular to the axial direction of the rotational axis 7 in that order from the center of the rotational axis 7. The first perpendicular portion 212a, the inclined portion 212b, and the second perpendicular portion 212c are continuously connected to each other. In contrast to the second air gap 212 on the second magnetic pole 22 side, an inclination direction of the inclined portion 212b is gradually inclined from the inside to the outside in the radial direction as advancing from the transmission side to the engine side. The intervals of the first perpendicular portion 212a, the inclined portion 212b, and the second perpendicular portion 212c are approximately the same.

Figure 12B:
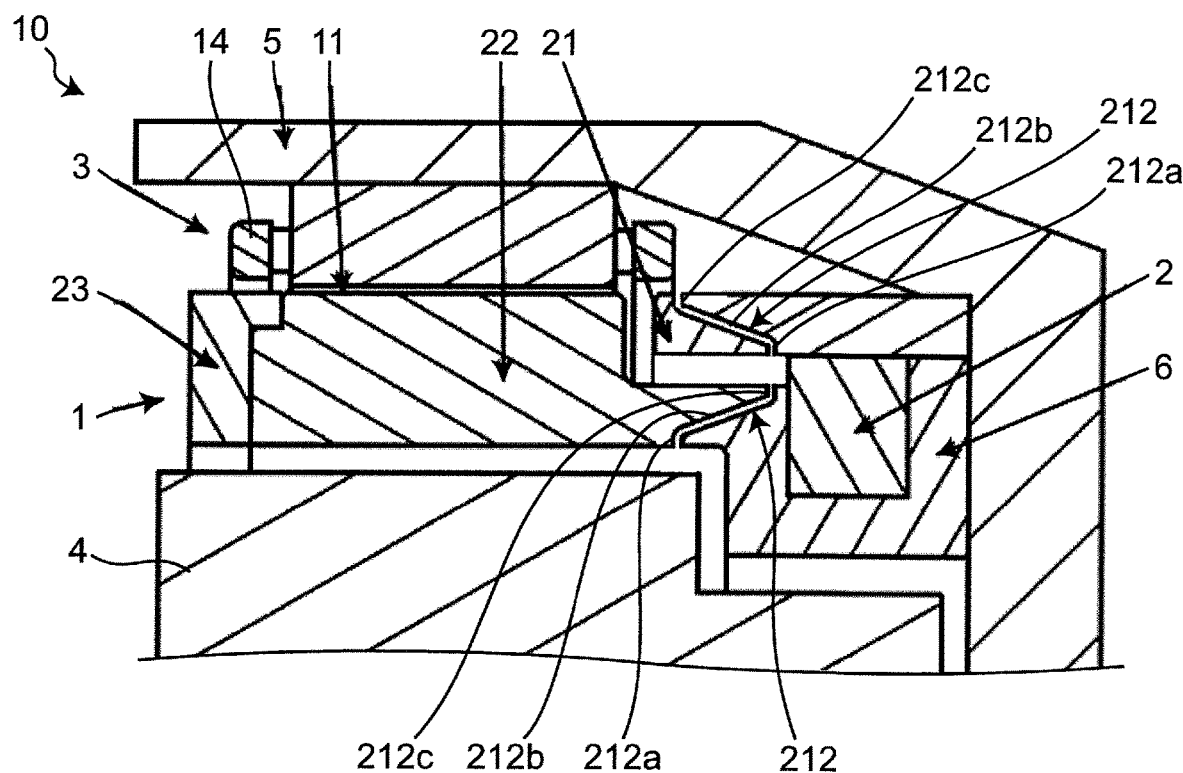
FIG. 12B is a partially enlarged view of FIG. 12A.

Consequently, when the inclination direction of the second air gap 212 on the first magnetic pole 21 side and the inclination direction of the second air gap 212 on the second magnetic pole 22 side are aligned with each other, as shown in FIG. 12B, the second air gaps 212 are arranged in an approximate V shape whose apex is directed from the engine side to the transmission side. This approximate V shape is an example and can be an approximate inverted V shape or a parallel shape. In other words, each of the inclination direction of the second air gap 212 on the first magnetic pole 21 side and the inclination direction of the second air gap 212 on the second magnetic pole 22 side can have any direction and any inclination angle. As an example, it is preferable that the inclination directions of the two be identical to each other from the viewpoint of balancing the magnetic flux and the axial force.

The second air gap 212 only needs to include at least the inclined portion 212b, and can further include one or both of the perpendicular portions 212a and 212c.

Here, the reason why the second air gap 212 is inclined in this way will be described.

When the second air gap 212 between the rotor 1 and the field coil 2 is formed as a plane perpendicular to the axial direction of the rotational axis 7, magnetic reluctance becomes high due to a small air gap cross-sectional area, which may cause an increase in field current that is required for a rotor field. Further, when the second air gap 212 is formed perpendicular to the axial direction of the rotational axis 7, an electromagnetic attractive force is generated in the axial direction, and a large axial force can be applied to a bearing (not shown) that supports the starting apparatus 4.

In particular, in a case where the second air gap 212 is formed perpendicular to the axial direction of the rotational axis 7, an effective magnetic path width of the second air gap 212 in the cross section is equivalent to a thickness of the field core 6 and a thickness of the magnetic pole. Further, when the field core 6 is excited, the electromagnetic attractive force acts between the field core 6 and the rotor 1. Therefore, when the second air gap 212 is formed perpendicular to the axial direction of the rotational axis 7, all of the electromagnetic attractive force act as the axial force.

On the other hand, as in the third embodiment, when the second air gap 212 is inclined from the axial direction of the rotational axis 7, compared with the case where the second air gap 212 is formed perpendicular to the axial direction, the effective magnetic path width of the second air gap 212 can be increased, and the axial force can be reduced by decomposing the electromagnetic attractive force into not only the axial force but also a radial force.

Figure 13C:
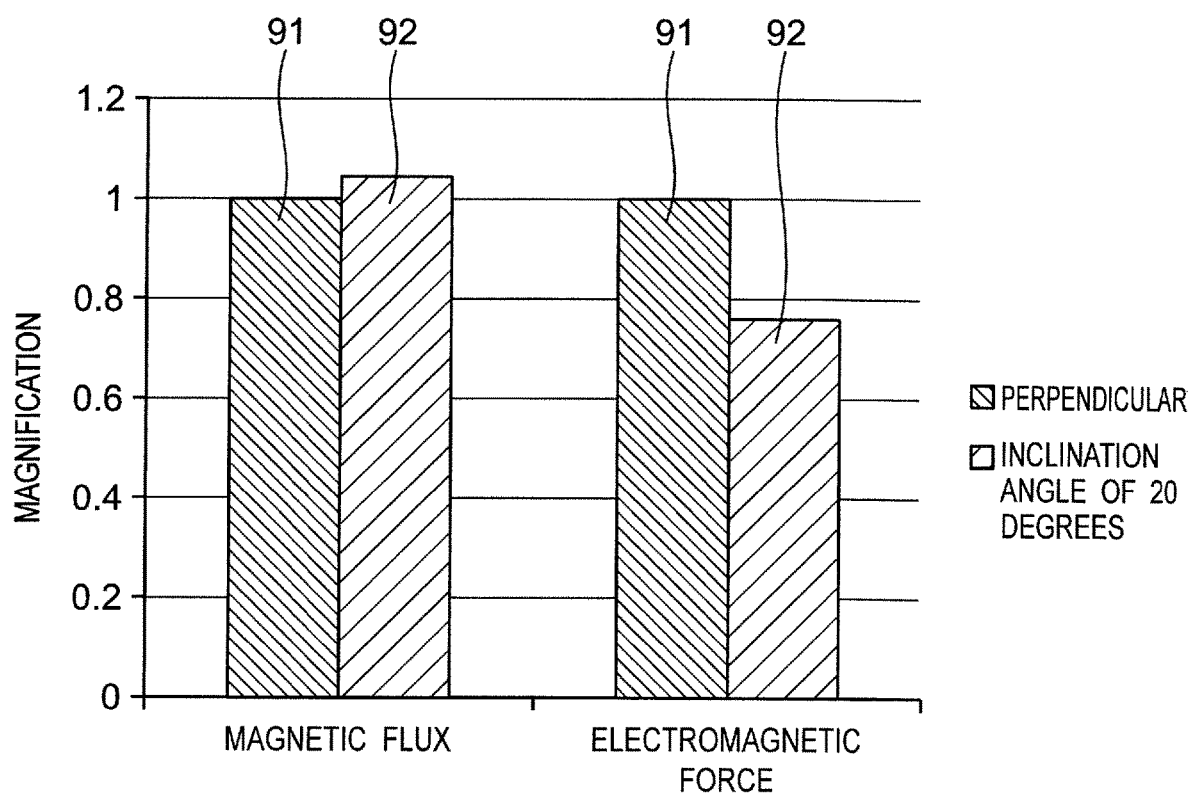
FIG. 13C is a graph showing, when respective magnifications of the magnetic flux and the electromagnetic force with the second air gap formed perpendicularly are defined as 1, respective magnifications of a magnetic flux and an axial electromagnetic force with a second air gap formed inclined (at, for example, an inclination angle of 20 degrees) as in the third embodiment.

Here, in FIG. 13C, the magnetic flux and the electromagnetic force in the case where the second air gap 212 is formed perpendicularly are represented by a bar graph 91, the magnetic flux and the electromagnetic force in the case where the second air gap 212 is formed obliquely as in the third embodiment are represented by a bar graph 92. Here, respective magnifications 1.04 and 0.76 of the magnetic flux and the electromagnetic force in the case where the second air gap 212 is formed obliquely as in the third embodiment are shown when respective magnifications of the magnetic flux and the electromagnetic force in the case where the second air gap 212 is formed perpendicularly are defined as 1. In the case where the second air gap 212 is formed obliquely as in the third embodiment, as compared with the case where the second air gap 212 is formed perpendicularly, the magnetic flux is increased by the increase in the effective magnetic path width, and the electromagnetic attractive force, in other words, electromagnetic force, is reduced by the decomposition into the radial force.

Accordingly, the reduction in the electromagnetic attractive force in the axial direction makes it possible to reduce the axial force applied to the bearing. As a result, it is possible to reduce a drag torque and increase fuel efficiency of a vehicle.

Further, inclining the second air gap 212 to increase the cross-sectional area of the second air gap 212 makes it possible to lower the magnetic reluctance and reduce the field current. As a result, it is possible to increase the efficiency of the rotary electrical machine 10 and further increase the fuel efficiency of a vehicle.

In order to reliably achieve the various effects described above, the inclination angle α of each inclined portion 212b is, for example, in a range from 10 degrees to 25 degrees from the axial direction of the rotational axis 7.

Note that each of the inclination directions of the inclined portions 212b in the first magnetic pole 21 and the second magnetic pole 22 can be an opposite direction. In other words, the inclined portion 212b on the second magnetic pole 22 side is gradually inclined from the inside to the outside in the radial direction as advancing from the transmission side to the engine side, while the inclined portion 212b on the first magnetic pole 21 side is gradually inclined outward from the inside in the radial direction as advancing from the engine side to the transmission side.

Figure 12C:
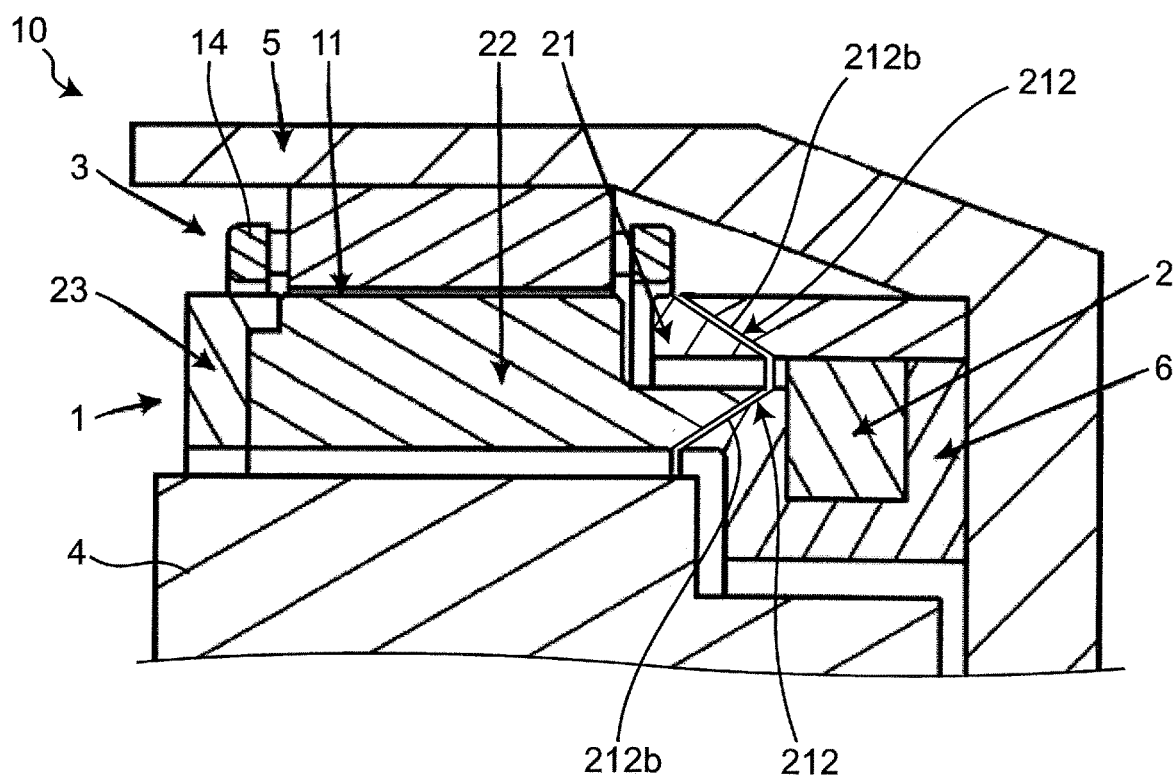
FIG. 12C is an explanatory diagram showing a cross-sectional view taken approximately along a direction orthogonal to a rotational axis of a rotary electrical machine according to a modification of the third embodiment of the present invention and an arrangement relation of the rotary electrical machine relative to an engine and a transmission.

Further, as shown in FIG. 12C, the second air gap 212 can include only the inclined portion 212b without the perpendicular portions 212a and 212c.

Accordingly, the field coil 2 is shifted in the axial direction of the rotational axis 7 to be in parallel to the rotor 1 with the second air gap 212 interposed between the field coil 2 and the rotor 1.

Note that, the configuration of the third embodiment corresponding to FIGS. 3 to 6 of the first embodiment is the same as the configuration of the first embodiment; thus description and illustration thereof is omitted.

In the rotary electrical machine 10 configured as described above, when the field coil 2 is energized, a field coil magnetic flux 15 is generated. The field coil magnetic flux 15 passes from the field core 6 through the second air gap 212, the first magnetic pole 21 of the rotor 1, the first air gap 11, the stator 3, the first air gap 11, the second magnetic pole 22 of the rotor 1, and the second air gap 212 and returns to the field core 6. At this time, for example, when a direct current is made to flow through the field coil 2, the field coil magnetic flux 15 is generated, thereby magnetizing the first magnetic pole 21 and the second magnetic pole 22, for example, to N pole and S pole, respectively.

A description will be given of a configuration where such a rotary electrical machine 10 serves as a starter to perform a start function. In accordance with a command to start the engine 8, an inverter (not shown) is driven to cause a three-phase alternating current flow through the stator 3 to magnetize the stator 3 and to cause a current flow through the field coil 2. Causing the current flow through the field coil 2 excites the first magnetic pole 21 and the second magnetic pole 22 of the rotor 1. As a result, the rotor 1 starts to rotate relative to the stator 3, and an electromotive force having an induced voltage is generated in the stator 3.

Thereafter, the induced voltage increases according to a rotation speed of the rotor 1, and when the rotation speed reaches an initial explosion rotation speed lower than an idling speed corresponding to idling of the engine 8, the driving of the inverter is stopped, and the rotary electrical machine 10 automatically shifts to a power generation mode, in other words, a mode where the rotary electrical machine 10 serves as a dynamo to perform a power generating function, so as to hold a predetermined induced voltage (required voltage).

In the power generation mode, when the field coil 2 continues to excite, an excitation current is adjusted to make the induced voltage constant at a predetermined induced voltage. When the excitation current is adjusted, the excitation current is first adjusted to make a magnetizing force of the field coil 2 constant. This is an intention of making the field coil 2 function just like a permanent magnet. As described above, when the rotor 1 rotates in a state as if a permanent magnet is disposed, the rotary electrical machine 10 functions as a dynamo.

As a result, connecting the engine 8 and the rotary electrical machine 10 allows the engine to start and allows the rotary electrical machine 10 to function as a generator (dynamo) during traveling.

According to the third embodiment, in the brushless field winding type rotary electrical machine 10 disposed on the outer circumference of the automobile starting apparatus 4, the second air gap 212 between the field coil 2 and the rotor 1 is formed to be inclined relative to the rotational axis 7. Specifically, employed is a structure in which the first magnetic pole 21 of the rotor 1 is an annular member having a large number of the claw portions 21b, the second magnetic pole 22 is an annular member having a large number of the protrusions 22b, and the first and second magnetic poles 21, 22 are alternately arranged in the circumferential direction and held by the magnetic pole holding member 23 made of a nonmagnetic material. Such a configuration can exhibit the following effects.

Figure 14:
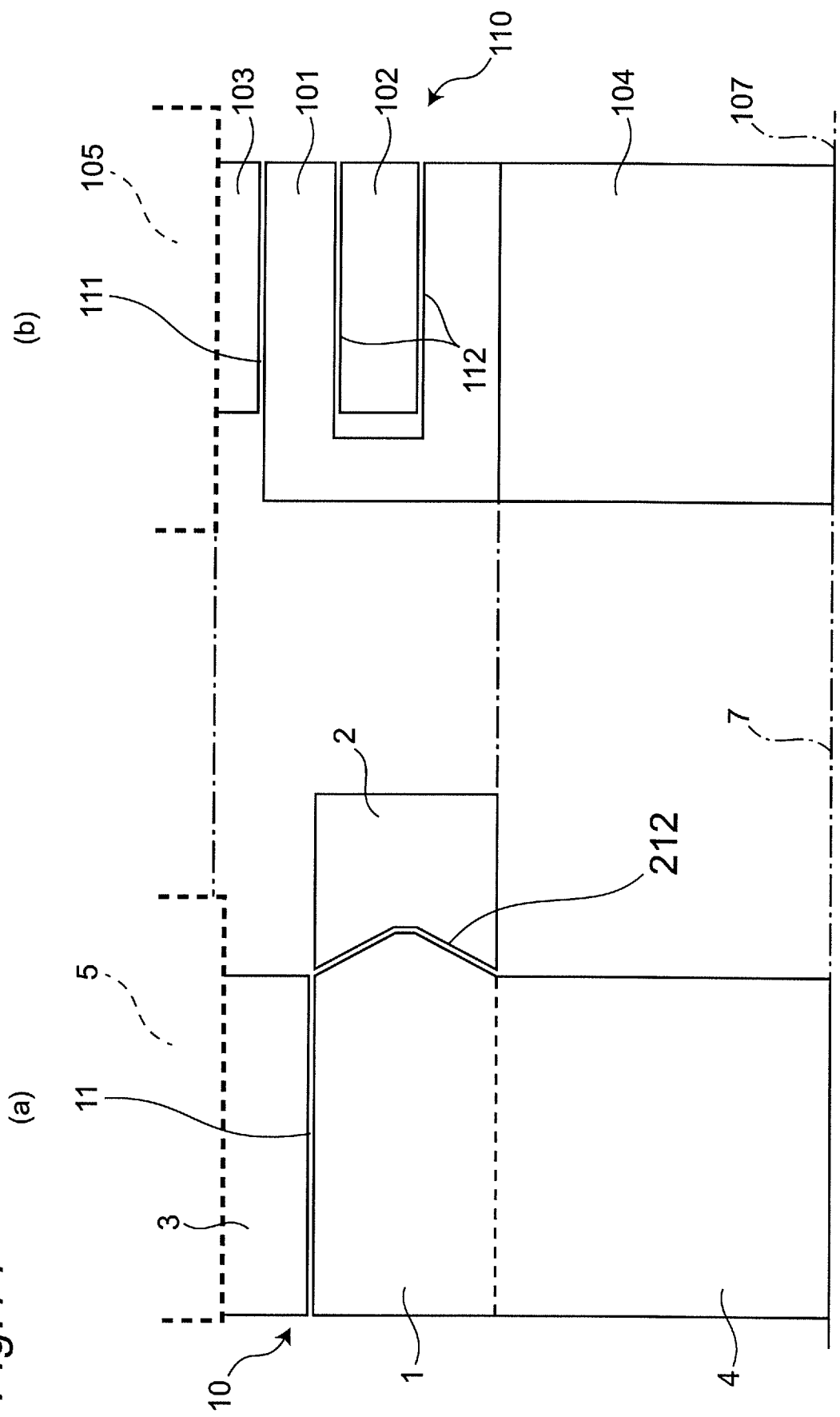
FIG. 14 is an explanatory diagram showing a relation between the configuration of the first embodiment and the configuration of the combination example of the conventional documents.

First, as shown in (b) of FIG. 14 as a combination example of conventional JP 3445492 B2 and JP 2010-516558 T that is a comparative example to the third embodiment, when the rotary electrical machine 110 is disposed outside the starting apparatus 104 in the radial direction, and three members of the stator 103, the rotor 101, and the field coil 102 are arranged in a space between the case 105 and the starting apparatus 104 from the outside to the inside in the radial direction, the more the number of turns of the field coil 102 increases to increase the magnetic flux of the field coil 102, the more the thickness in the radial direction increases, which makes it unable to put the three members into the space and accordingly fails to increase the magnetic flux.

On the other hand, in the third embodiment, as shown in (a) of FIG. 14, employed is a configuration in which the field coil 2 is shifted in the axial direction of the rotational axis 7 to be in parallel to the stator 3 and the rotor 1. This configuration causes only the two members of the stator 3 and the rotor 1 to be present outside the starting apparatus 4 in the radial direction, which eliminates the need for a space for disposing the field coil 2 outside the starting apparatus 4 in the radial direction. Accordingly, it is possible to reduce the radial dimension of the outside of the starting apparatus 4 by at least the space for disposing the field coil 2 or increase the thickness of the stator 3 or the rotor 1 by the space for disposing the field coil 2 for effective use of the space for disposing the field coil 2. Further, since the field coil 2 is disposed at a position shifted in the axial direction relative to the stator 3 and the rotor 1, it is possible to increase the thickness of the field coil 2 in the radial direction to increase the magnetic flux of the field coil 2 without considering the space for the stator 3 and the rotor 1. This makes it possible to increase the degree of freedom in designing.

Further, as shown in (b) of FIG. 14, when the stator 103, the rotor 101, and the field coil 102 are arranged from the outside to the inside in the radial direction, it is required that a dimension of an interval between the rotor 101 and the field coil 102 to be designed in consideration of the change in thickness caused by expansion due to the centrifugal force applied to the rotor 101 and be generally designed larger than a required dimension.

On the other hand, as shown in (a) of FIG. 14, the field coil 2 is shifted in the axial direction relative to the stator 3 and the rotor 1 to form as the second air gap 212 an interval inclining from the axial direction between the field coil 2 and the rotor 1, which makes it possible to increase the efficiency of the rotary electrical machine 10 and reduce the axial force as described above.

Further, in the radial arrangement as shown in (b) of FIG. 14, concentricity (position adjustment of concentric positions) between the rotor 101 on a rotating side and the field coil 102 on a stationary side is strictly adjusted; however, as shown in (a) of FIG. 14, when the field coil 102 is shifted in the axial direction, there is no need to adjust the concentricity between the rotor 1 on the rotating side and the field coil 2 on the stationary side as strict as the configuration in (b) of FIG. 14.

Further, in the configuration in (a) of FIG. 14, allowing the field coil 2 to be disposed in either a space in the engine or a space adjacent to the transmission of the rotor 1 in the axial direction makes it possible to use the space effectively.

Further, the rotor 1 of the rotary electrical machine 10 is connected to the starting apparatus 4 that is a synchronous rotating member synchronously rotating with an output shaft (rotational shaft) 7 of the engine 8, and the rotary electrical machine 10 is disposed so that the center axis of the output shaft of the engine 8 is aligned with a rotation axis of the rotor 1, which makes it possible to surely transmit a rotational driving force of the rotary electrical machine 10 to the engine 8 even in a cold state and surely start the engine 8 in the cold state.

Therefore, according to the third embodiment, in a narrow space on an inner circumferential side of the case 5 and an outer circumferential side of the starting apparatus 4, one of the stator 3 and the field coil 2 other than the rotor 1 is disposed. Such a disposition only requires two members to be arranged on diameters that are coaxial with the rotational axis 7 but different from each other, and thus allows an increase in the degree of freedom in designing and an increase in the output performance of the rotary electrical machine 10. Furthermore, the second air gap 212 has the inclined portion 212b that is an interval inclined from the axial direction of the rotational axis 7 on one end surface of the rotor 1 in the axial direction of the rotational axis 7, which makes it possible to increase the efficiency of rotary electrical machine 10 and reduce the axial force.

Fourth Embodiment

Figure 15:
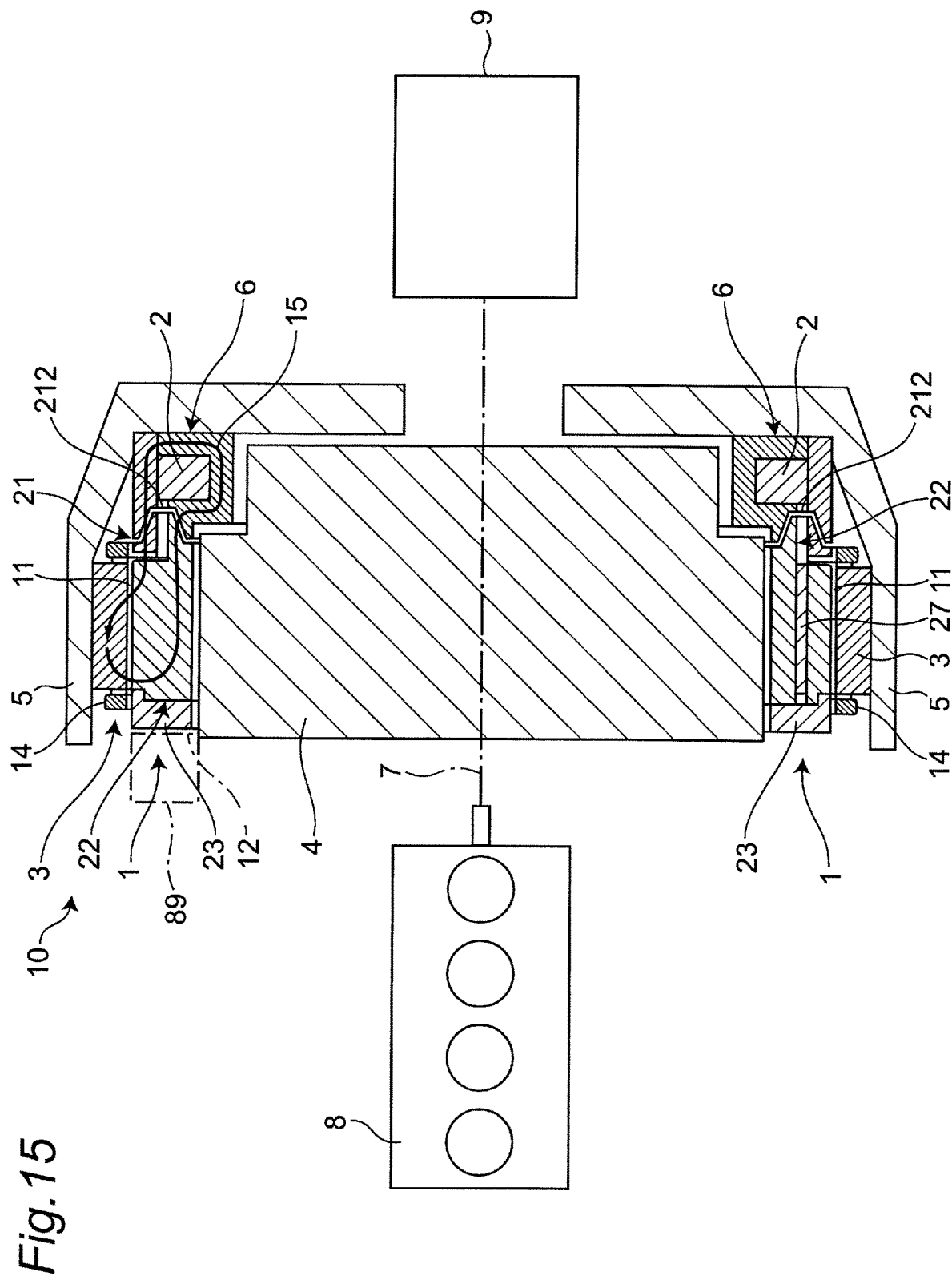
FIG. 15 is an explanatory diagram showing a cross-sectional view taken approximately along a direction orthogonal to a rotational axis of a rotary electrical machine according to a fourth embodiment of the present invention and an arrangement relation of the rotary electrical machine relative to an engine and a transmission.
Figure 16:
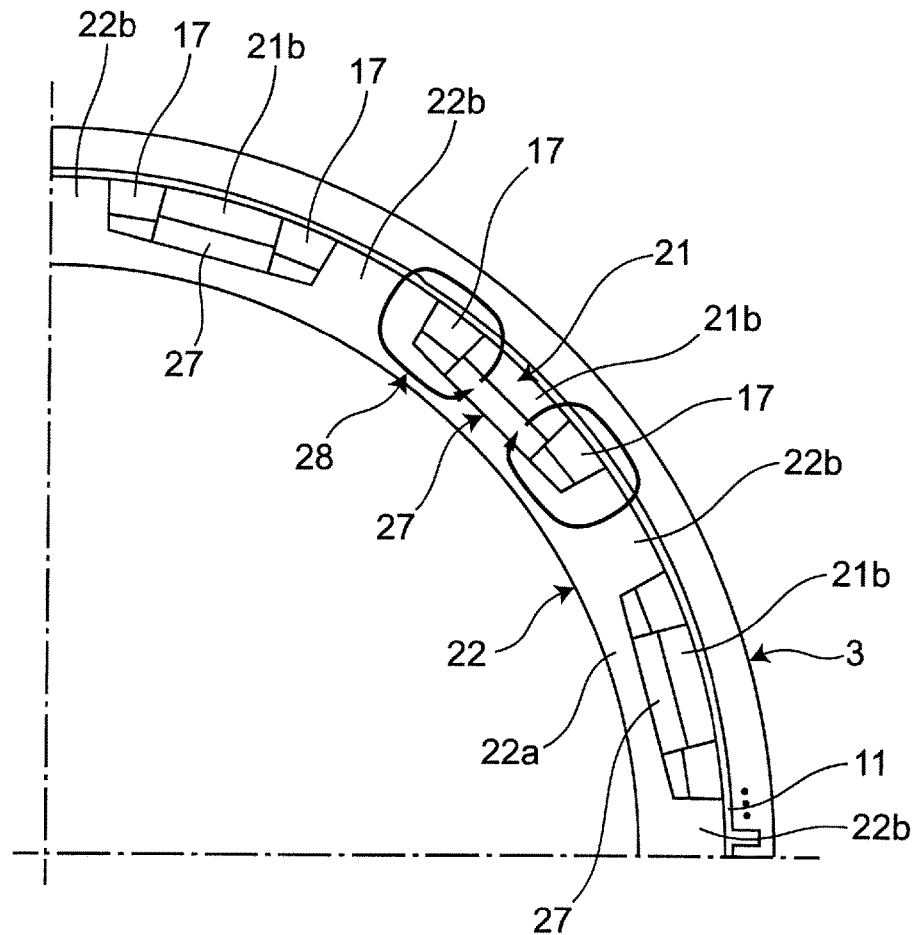
FIG. 16 is a partial front view of the rotary electrical machine according to the fourth embodiment.
Figure 17:
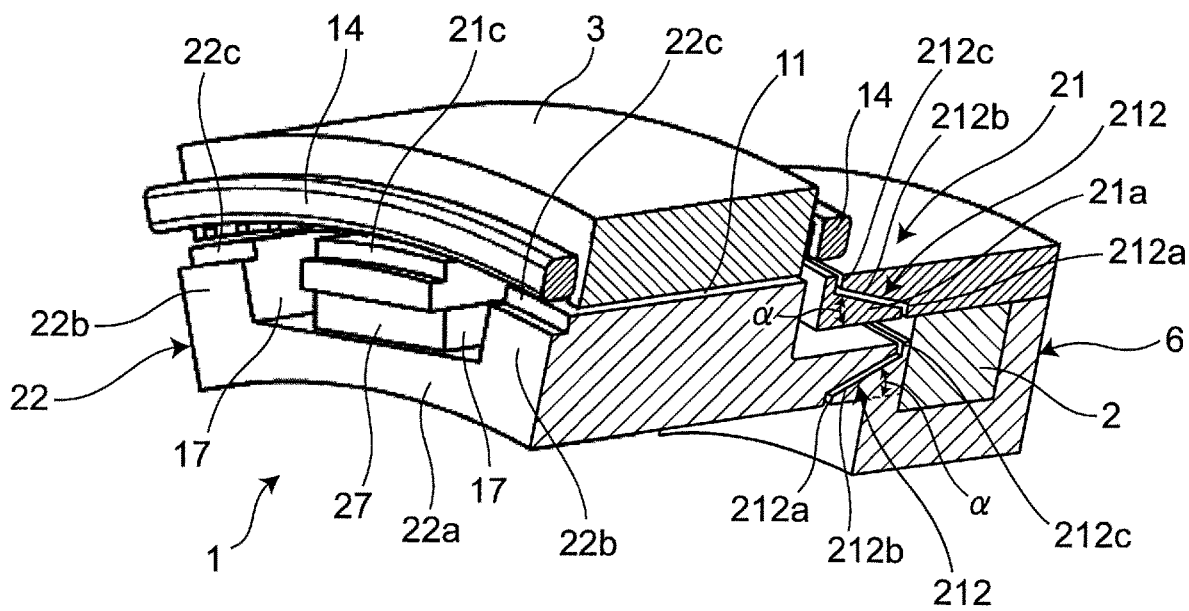
FIG. 17 is a perspective view of the rotary electrical machine according to the fourth embodiment without a magnetic pole holding member, taken along the direction orthogonal to the rotational axis of the rotary electrical machine.
Figure 18:
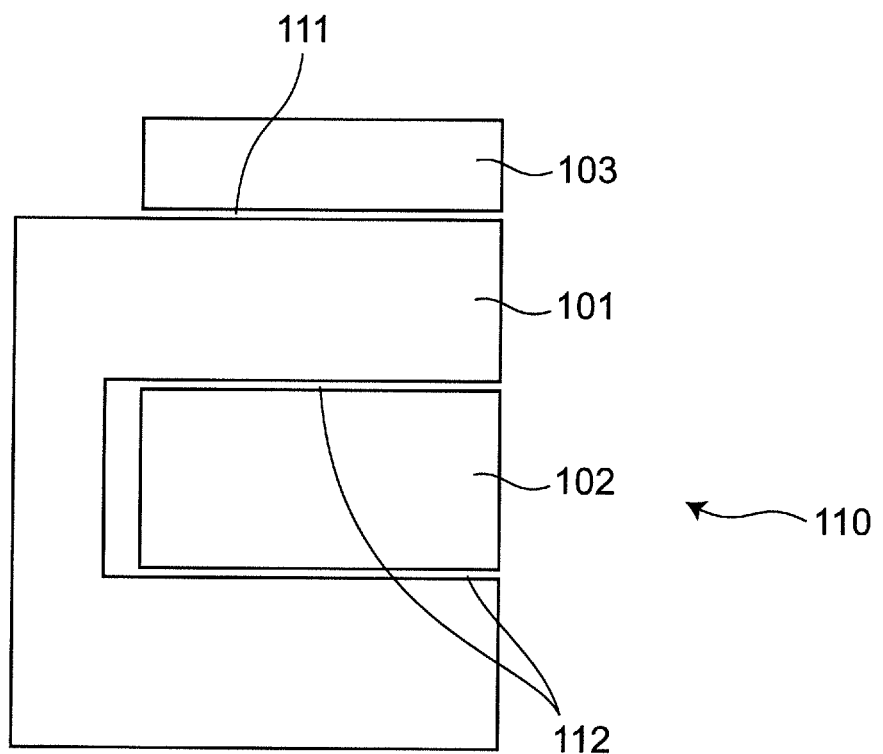
FIG. 18 is an explanatory diagram showing a schematic configuration of a conventional rotary electrical machine.

As shown in FIGS. 15 to 17, a fourth embodiment of the present invention can have a structure in which a permanent magnet 27 is disposed inside the rotor 1 in the configuration of the third embodiment.

More specifically, the permanent magnet 27 having, for example, a rectangular plate shape is provided at the same circumferential position as each of the claw portions 21b of the first magnetic pole 21, on an inner diameter side of each of the claw portions 21b of the first magnetic pole 21 and on an outer diameter side of the second annular portion 22a of the second magnetic pole 22, and is sandwiched between an inner circumferential surface of each of the claw portions 21b and the outer circumferential surface of the second annular portion 22a. This arrangement causes, as shown in FIG. 16, a magnet magnetic flux 28 of the permanent magnet 27 to be formed between each of the claw portions 21b of the first magnetic pole 21 and the protrusions 22b of the second magnetic pole 22.

The permanent magnet 27 is a magnet primarily made of neodymium or a magnet primarily made of ferrite. Specifically, as the permanent magnet 27, various kinds of permanent magnets such as a SmCo magnet, an AlNiCo magnet, a neodymium bonded magnet, and the like can be used. The permanent magnet 27 is disposed entirely or partially an inner surface of each of the claw portions 21b.

Such a configuration makes it possible to increase output performance by using the magnet magnetic flux 28 of the permanent magnet 27 in addition to a magnetic flux generated in the rotor 1 by the field coil 2. Further, holding the permanent magnet 27 with the claw portions 21b makes it possible to increase strength of the permanent magnet 27 against a centrifugal force, which can prevent the permanent magnet 27 from deforming due to the centrifugal force and thus increase centrifugal strength during high speed rotation.

By appropriately combining arbitrary embodiments or modifications of the above various embodiments or modifications, respective effects can be produced. Additionally, combination between embodiments, combination between working examples, or combination between an embodiment(s) and a working example(s) is possible, and combination between characteristics in different embodiments or working examples is possible as well.

Although the present invention has been fully described in connection with the embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

INDUSTRIAL APPLICABILITY

The rotary electrical machine according to the aspect of the present invention allows an increase in the degree of freedom in designing and an increase in the output performance, and is suitable for a power transmitting apparatus including a rotary electrical machine that integrally has a power generating function and an engine start function of an alternator and a starter motor of a vehicle.

REFERENCE SIGNS LIST 1. rotor
2. field coil
3. stator
4. starting apparatus
5. case
6. field core
7. rotational axis
8. engine
9. transmission
10. brushless field winding type rotary electrical machine
11. first air gap
12. second air gap
14. AC coil
15. field coil magnetic flux
16. radial interval
17. circumferential interval
19. axial interval
21. first magnetic pole
21a. first annular portion
21b. claw portion
21c. first leading end locking portion
22. second magnetic pole
22a. second annular portion
22b. protrusion
22c. second leading end locking portion
22d. inserting portion
23. magnetic pole holding member
23a. fitting portion
27. permanent magnet
28. magnetic flux of permanent magnet
89. region where field coil is disposed on a side adjacent to engine of stator
91, 92. bar graph
212. second air gap
212a, 212c. perpendicular portion
212b. inclined portion
α. inclination angle

The invention claimed is:

1. A brushless field winding type rotary electrical machine disposed between an engine and a transmission along a rotational axis and positioned between a case housing a starting apparatus and the starting apparatus, comprising:
a stator held by the case, the stator including therein an AC coil that generates a rotating magnetic field with an alternating current;
a field core held by the case, the field core including therein a field coil that is excited by a direct current; and
a rotor disposed on an outer circumference of the starting apparatus and held rotatably about the rotational axis relative to the stator and the field coil, wherein
a first air gap is formed between the stator and the rotor, the first air gap configured to allow a magnetic flux to flow between the stator and the rotor,
a second air gap is formed between the field core and the rotor, the second air gap configured to allow a magnetic flux to flow between the field core and the rotor, the second air gap configured to define an interval extending along a direction that intersects an axial direction of the rotational axis on one end surface of the rotor in the axial direction of the rotational axis
the rotor includes
a first magnetic pole having a plurality of claw portions protruding from a first annular portion in the axial direction of the rotational axis,
a second magnetic pole having a plurality of protrusions that protrude in a radial direction and are arranged on an outer circumferential surface of a second annular portion at circumferential intervals in a circumferential direction thereof, the second annular portion disposed inside the first annular portion with a radial interval interposed between the second annular portion and the first annular portion and partially overlapping the first annular portion, and
a magnetic pole holding member with an annular shape having a fitting portion where the claw portions of the first magnetic pole and the protrusions of the second magnetic pole are fixedly fitted to each other,
each of the claw portions of the first magnetic pole is inserted into the interval between the protrusions of the second magnetic pole to alternately arrange the claw portion of the first magnetic pole and the protrusion of the second magnetic pole in the circumferential direction, and the first magnetic pole and the second magnetic pole are fixedly fitted to the magnetic pole holding member without contacting each other.

2. The rotary electrical machine according to claim 1, wherein the second air gap is an interval extending along the radial direction on the one end surface of the rotor in the axial direction of the rotational axis, the radial direction being perpendicular to the axial direction of the rotational axis.

3. The rotary electrical machine according to claim 1, wherein the second air gap has an inclined portion that is an interval inclined from the axial direction of the rotational axis on the one end surface of the rotor in the axial direction of the rotational axis.

4. The rotary electrical machine according to claim 3, wherein the second air gap has the inclined portion inclined from the axial direction of the rotational axis and a perpendicular portion that extends continuously from the inclined portion and perpendicular to the rotational axis.

5. The rotary electrical machine according to claim 3, wherein an inclination angle of the inclined portion is in a range from 10 degrees to 25 degrees from the axial direction of the rotational axis.

6. The rotary electrical machine according to claim 1, wherein the field coil of the field core is disposed parallel to the rotor in the axial direction of the rotational axis with the second air gap.

7. The rotary electrical machine according to claim 1, wherein the first air gap is an interval that extends along the axial direction of the rotational axis on the one end surface of the rotor in the axial direction of the rotational axis.

8. The rotary electrical machine according to claim 1, wherein a first leading end locking portion of each of the claw portions of the first magnetic pole is fitted to the fitting portion disposed on an outer circumferential side of the magnetic pole holding member and fixedly held in the radial direction, and a second leading end locking portion of the second magnetic pole is fitted to the fitting portion of the magnetic pole holding member and fixedly held in the radial direction.

9. The rotary electrical machine according to claim 1, wherein the magnetic pole holding member is nonmagnetic.

10. The rotary electrical machine according to claim 1, wherein each of the first magnetic pole and the second magnetic pole is soft magnetic.

11. The rotary electrical machine according to claim 1, further comprising
a permanent magnet disposed at a same circumferential position as each of the claw portions of the first magnetic pole is disposed, and on an inner diameter side of the first magnetic pole and an outer diameter side of the second annular portion of the second magnetic pole.

12. The rotary electrical machine according to claim 11, wherein the permanent magnet is a magnet primarily made of neodymium.

13. The rotary electrical machine according to claim 11, wherein the permanent magnet is a magnet primarily made of ferrite.

* * * * *